Figure 1:
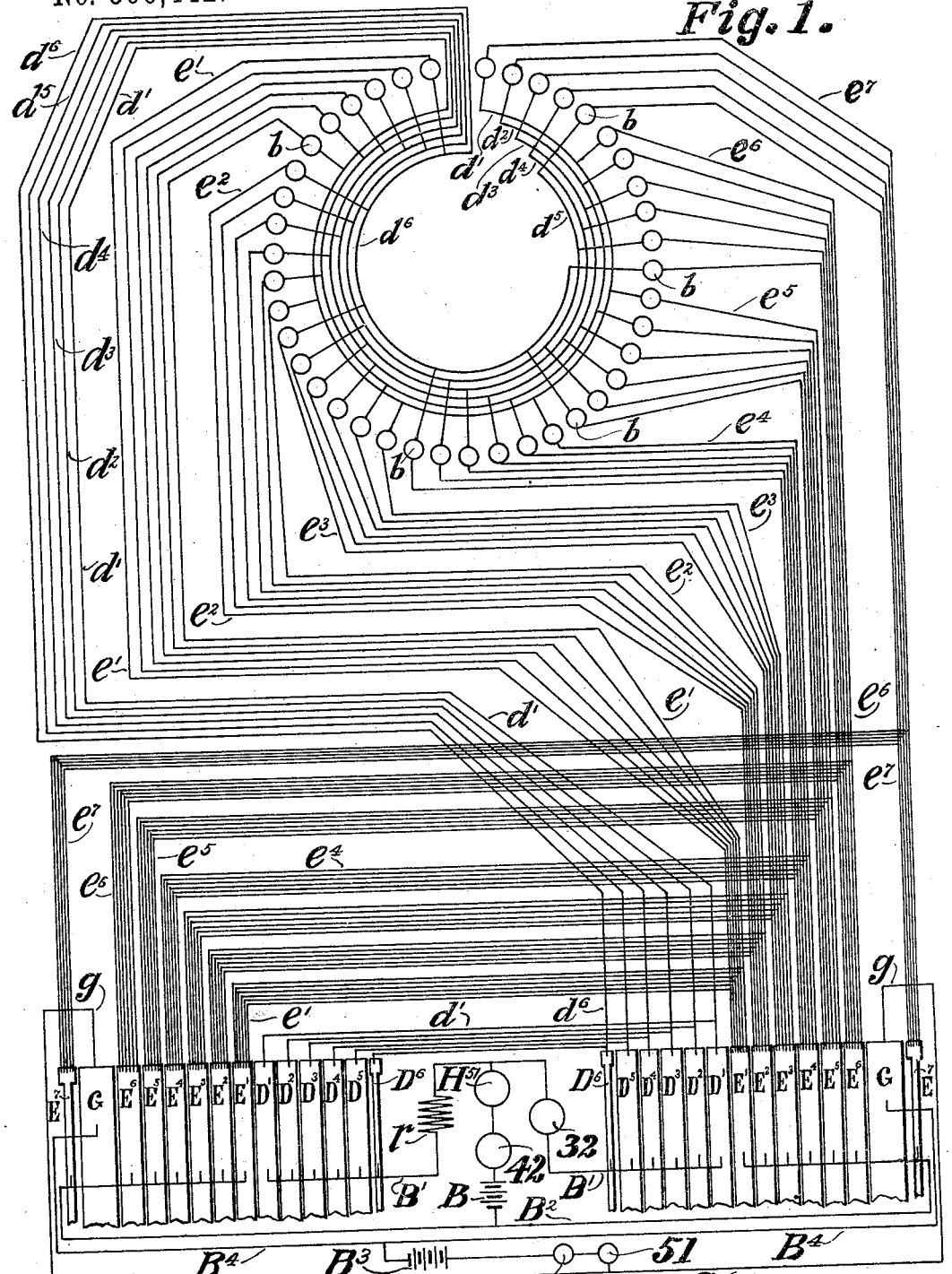

(No Model.)  16 Sheets—Sheet 1.

T. CAHILL.
TYPE WRITING MACHINE.

No. 566,442.  Patented Aug. 25, 1896.

Attest: A. M. Poynter, M. H. Cahill

Inventor: Thaddeus Cahill

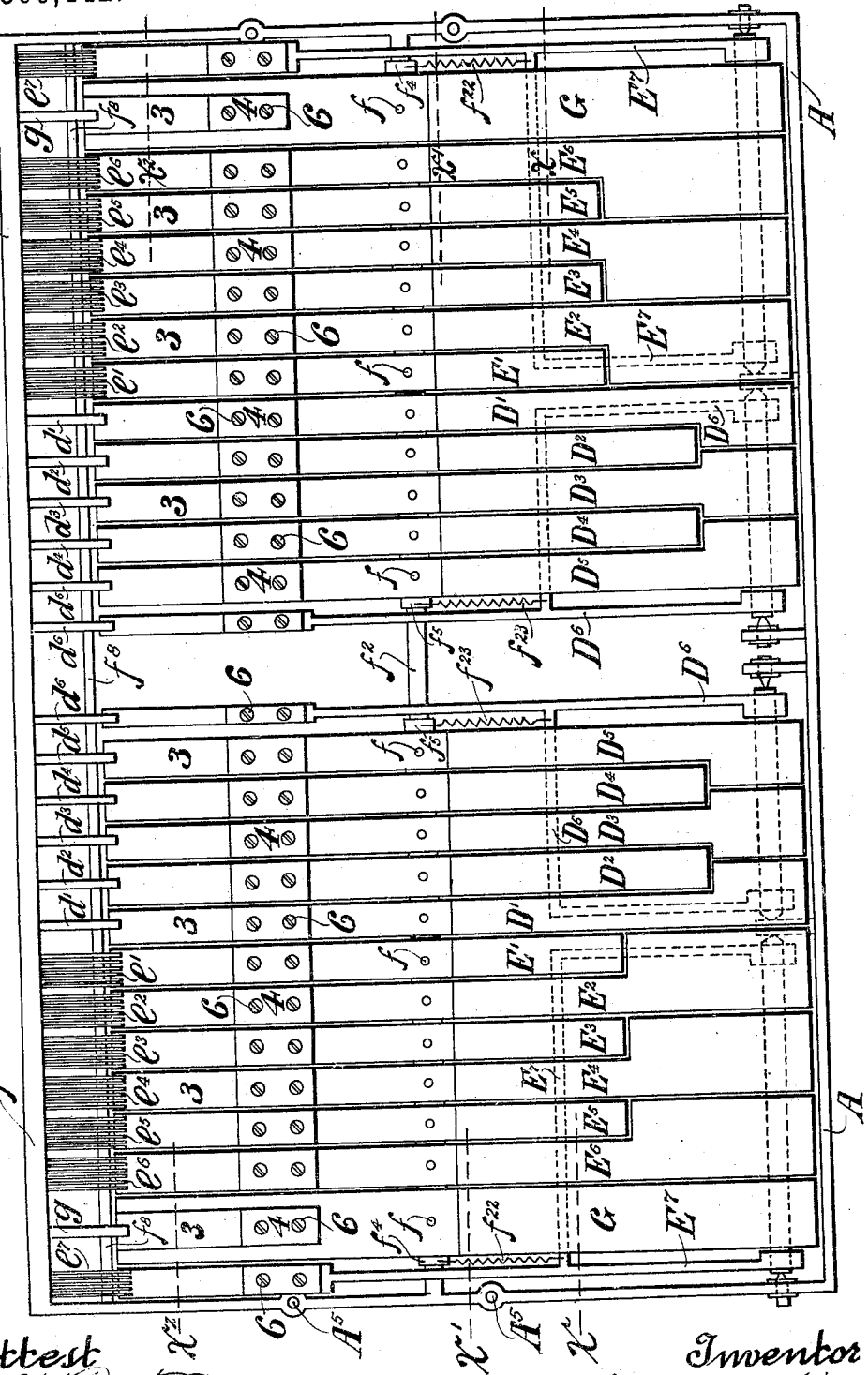

(No Model.) 16 Sheets—Sheet 3.
T. CAHILL.
TYPE WRITING MACHINE.
No. 566,442. Patented Aug. 25, 1896.
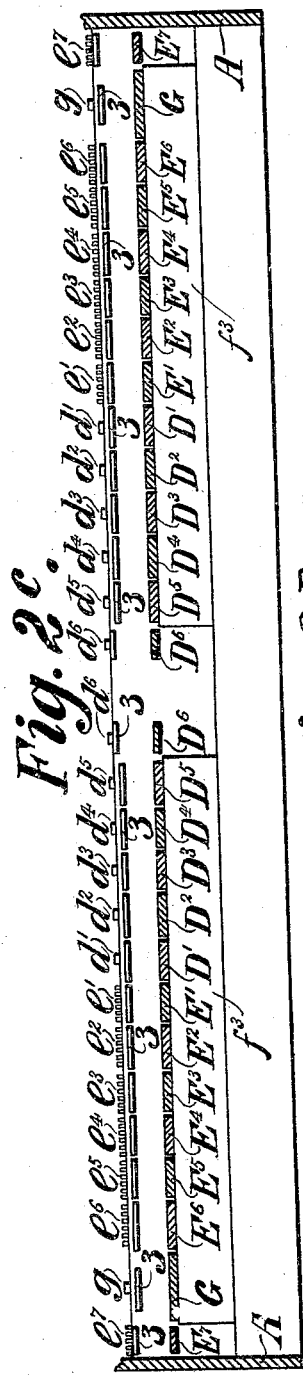
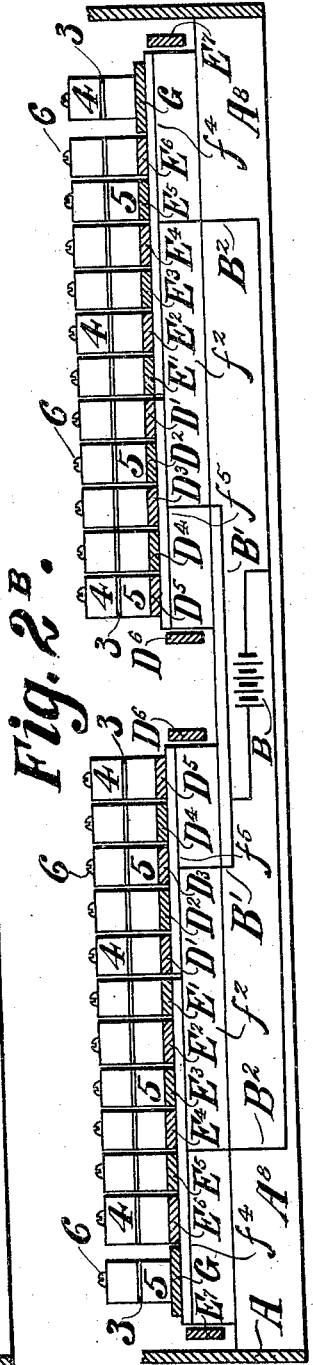
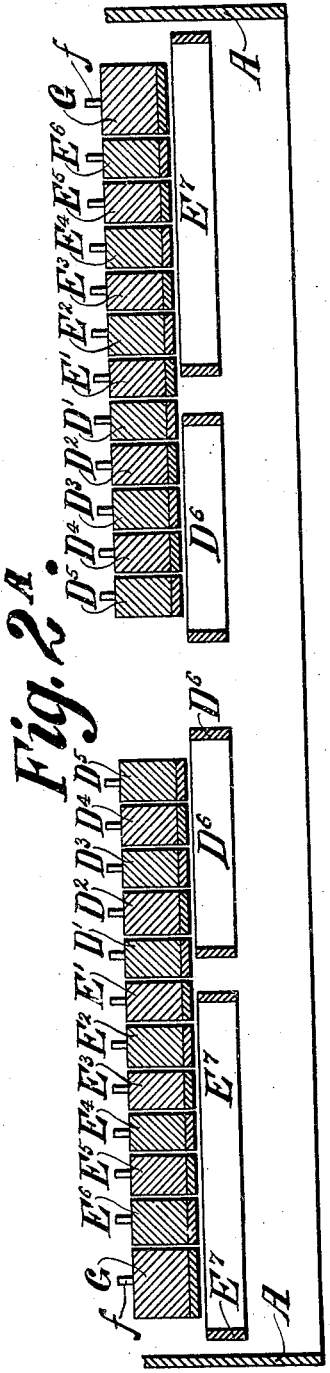
Attest
A. M. Poynton
M. H. Cahill.
Inventor
Thaddeus Cahill

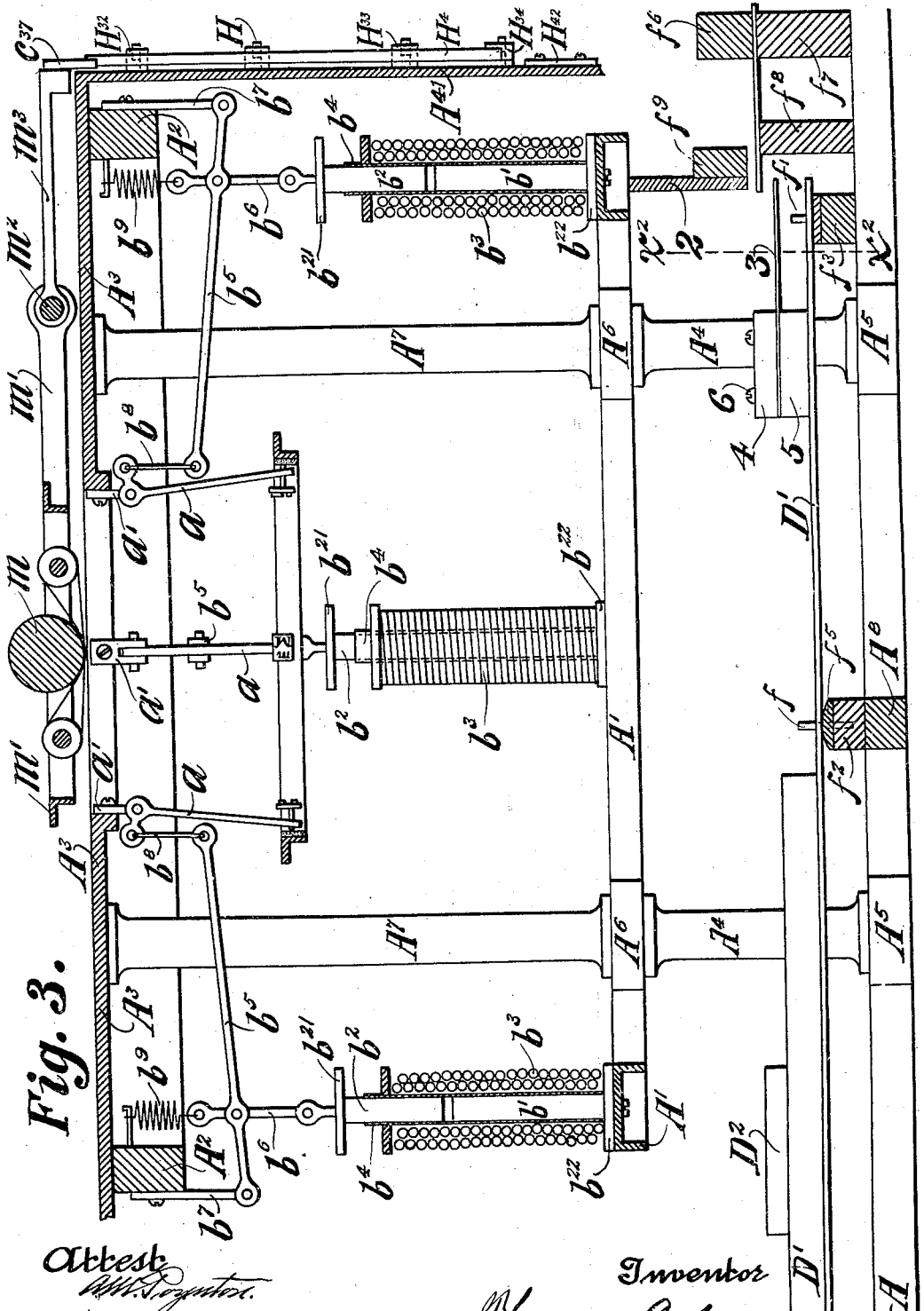

(No Model.) 16 Sheets—Sheet 5.
T. CAHILL.
TYPE WRITING MACHINE.
No. 566,442. Patented Aug. 25, 1896.
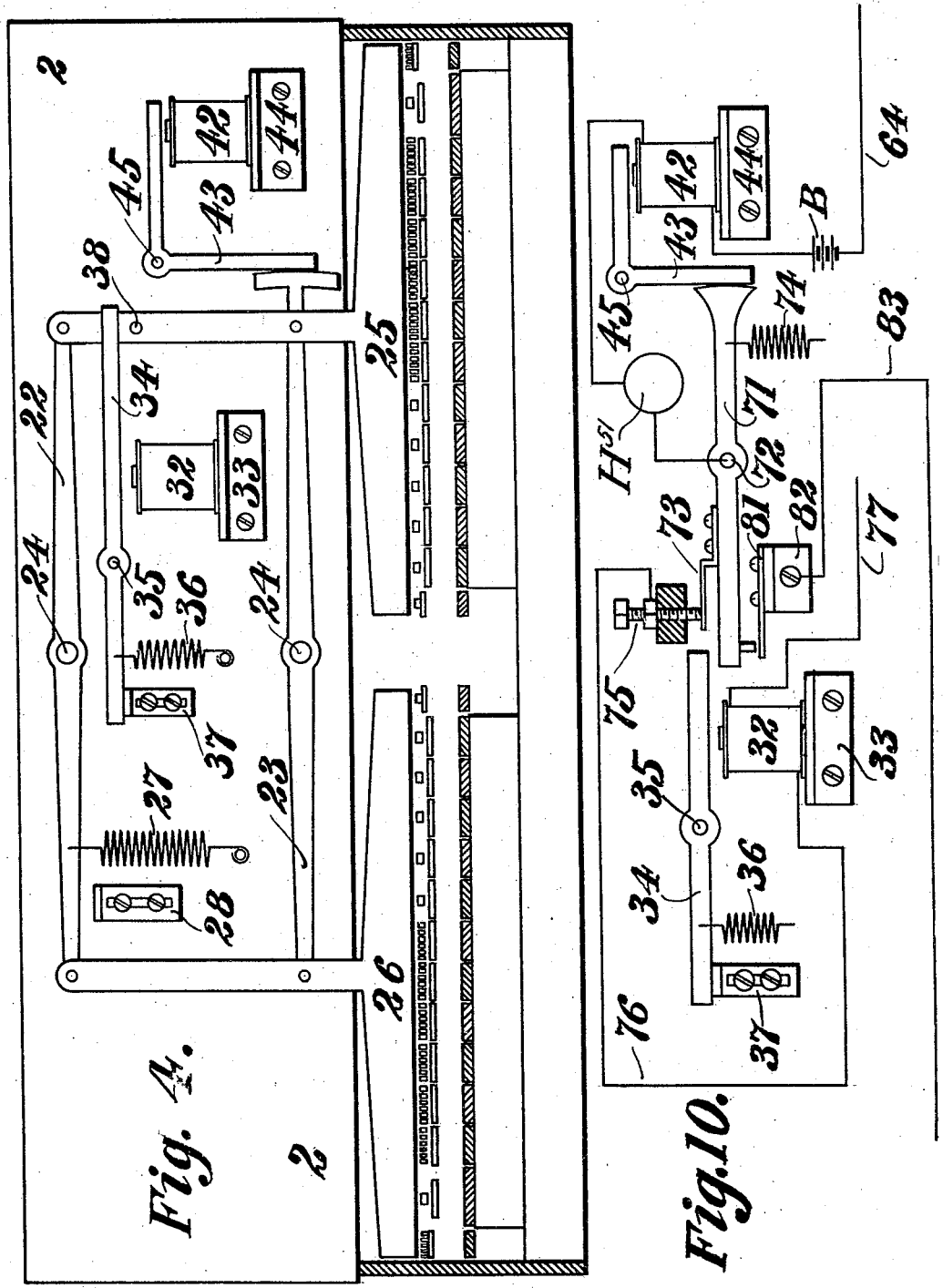
Attest
Inventor
Thaddeus Cahill (No Model.)  
16 Sheets—Sheet 6.
T. CAHILL.
TYPE WRITING MACHINE.
No. 566,442. Patented Aug. 25, 1896.
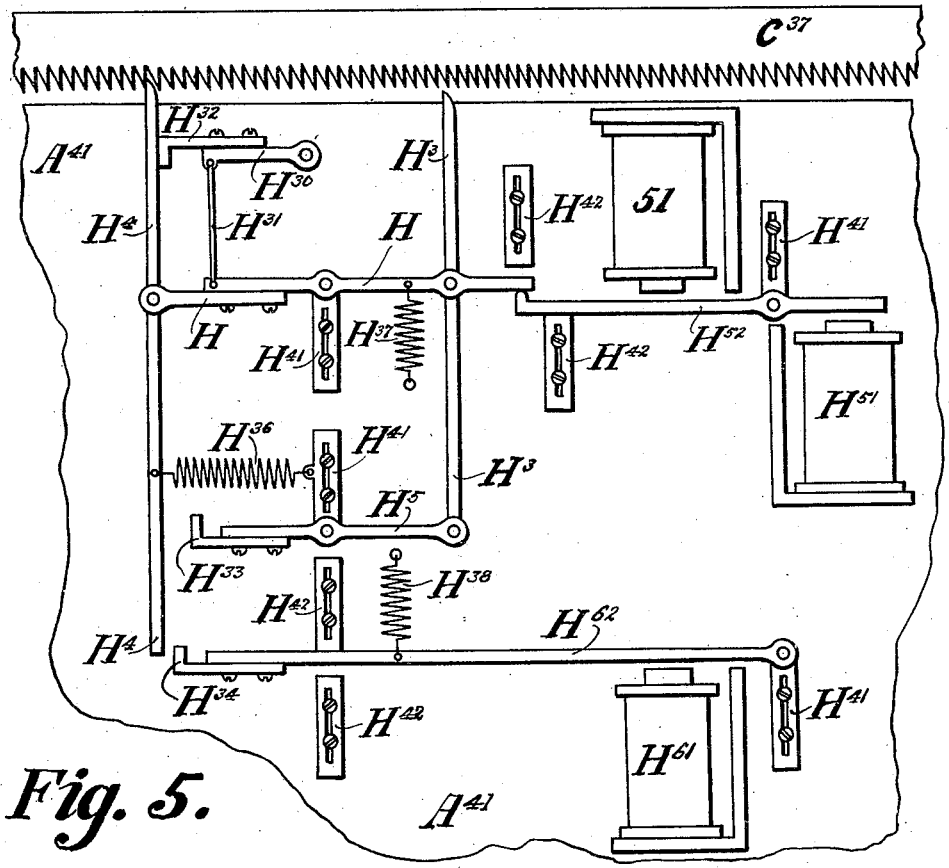
Fig. 5.
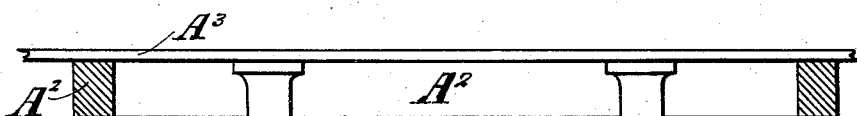
Fig. 8.
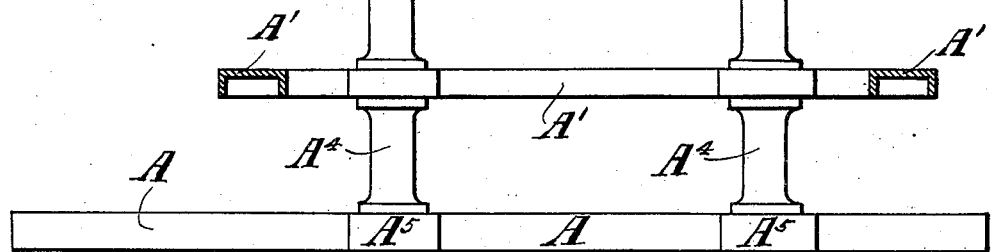

(No Model.) 16 Sheets—Sheet 7.
T. CAHILL.
TYPE WRITING MACHINE.
No. 566,442. Patented Aug. 25, 1896.
*Fig. 7.*
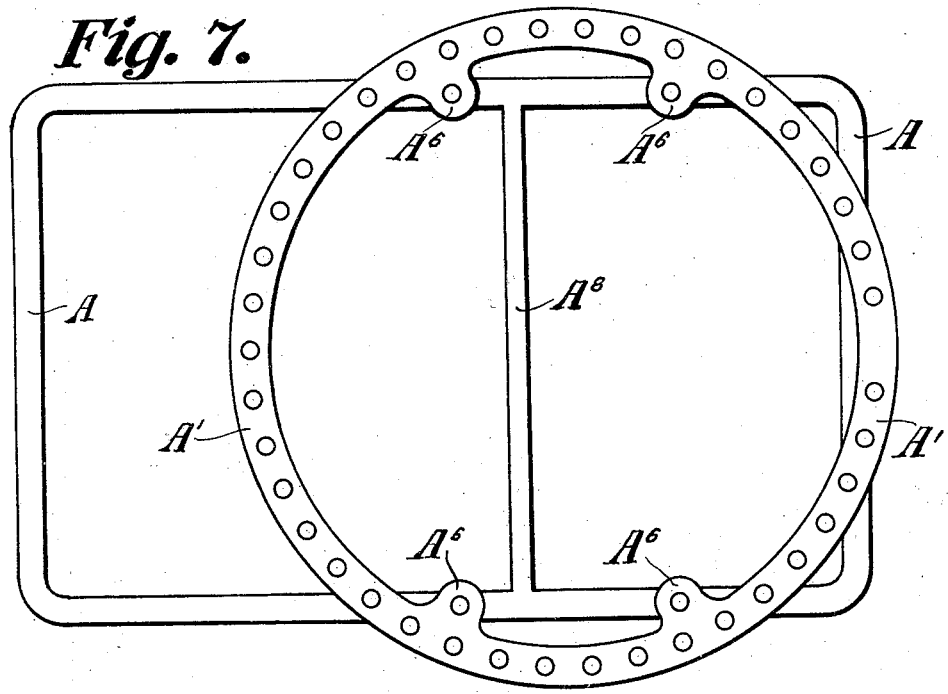
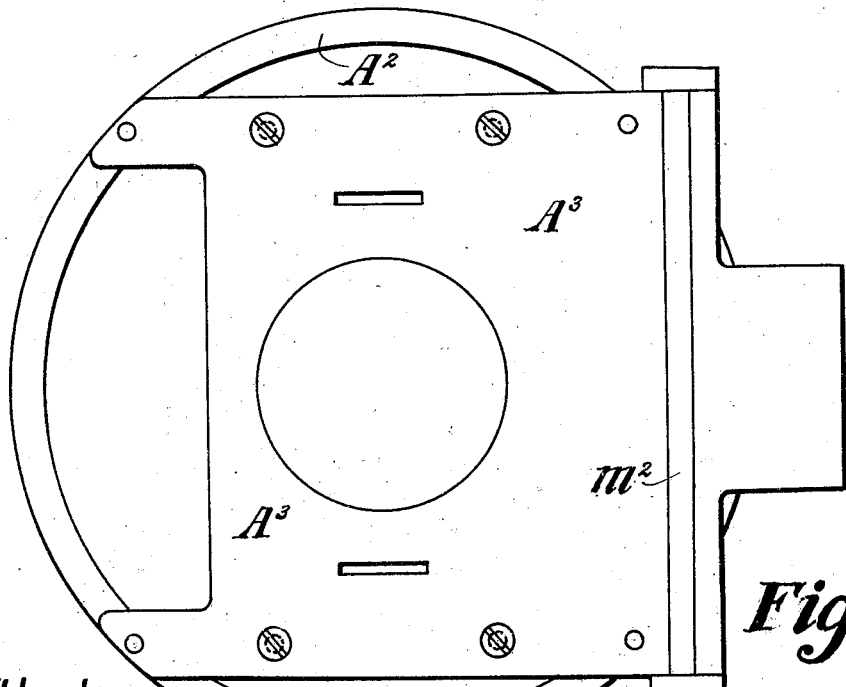
*Fig. 6.*
Attest
H. W. Poynton
M. H. Cahill
Inventor
Thaddeus Cahill

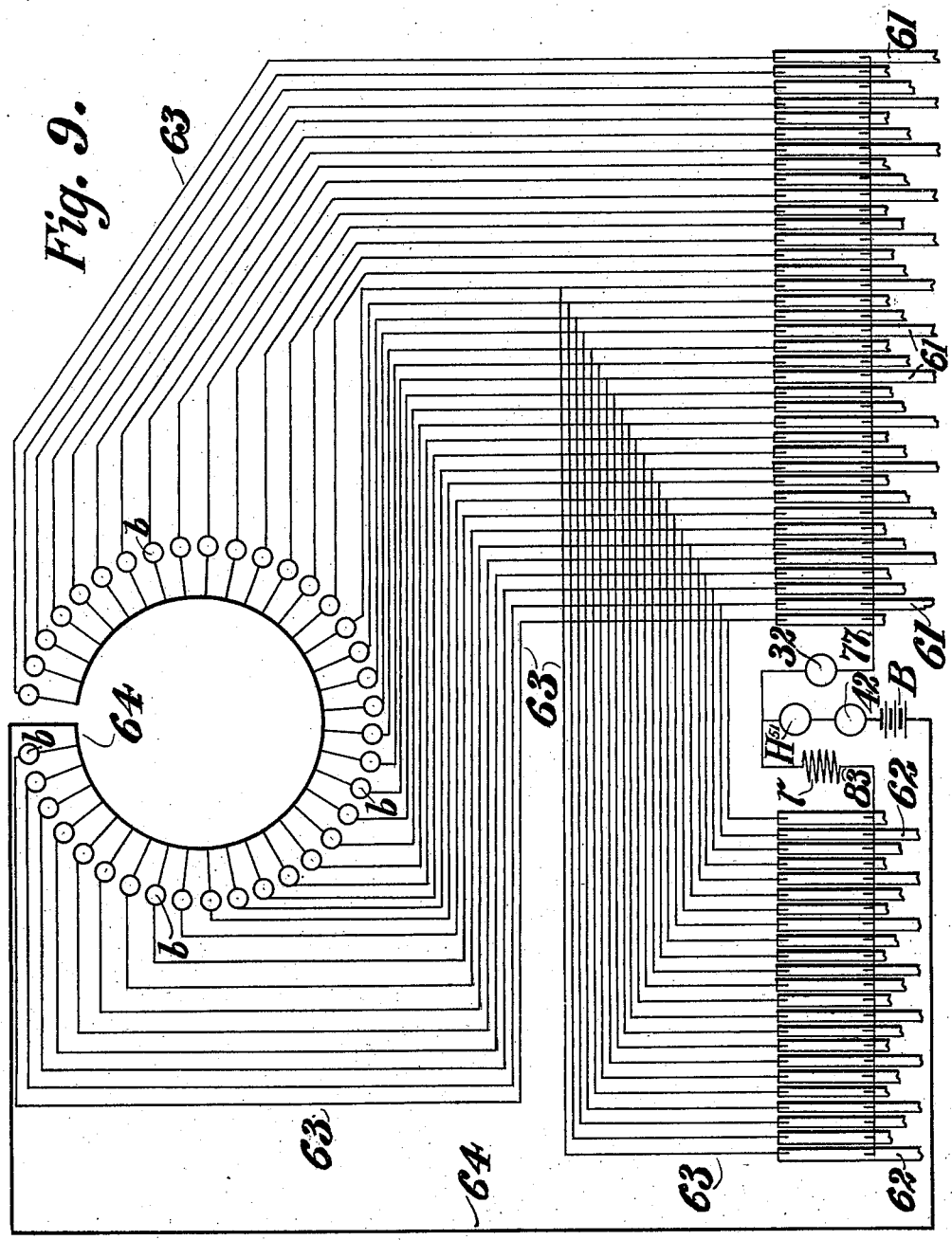

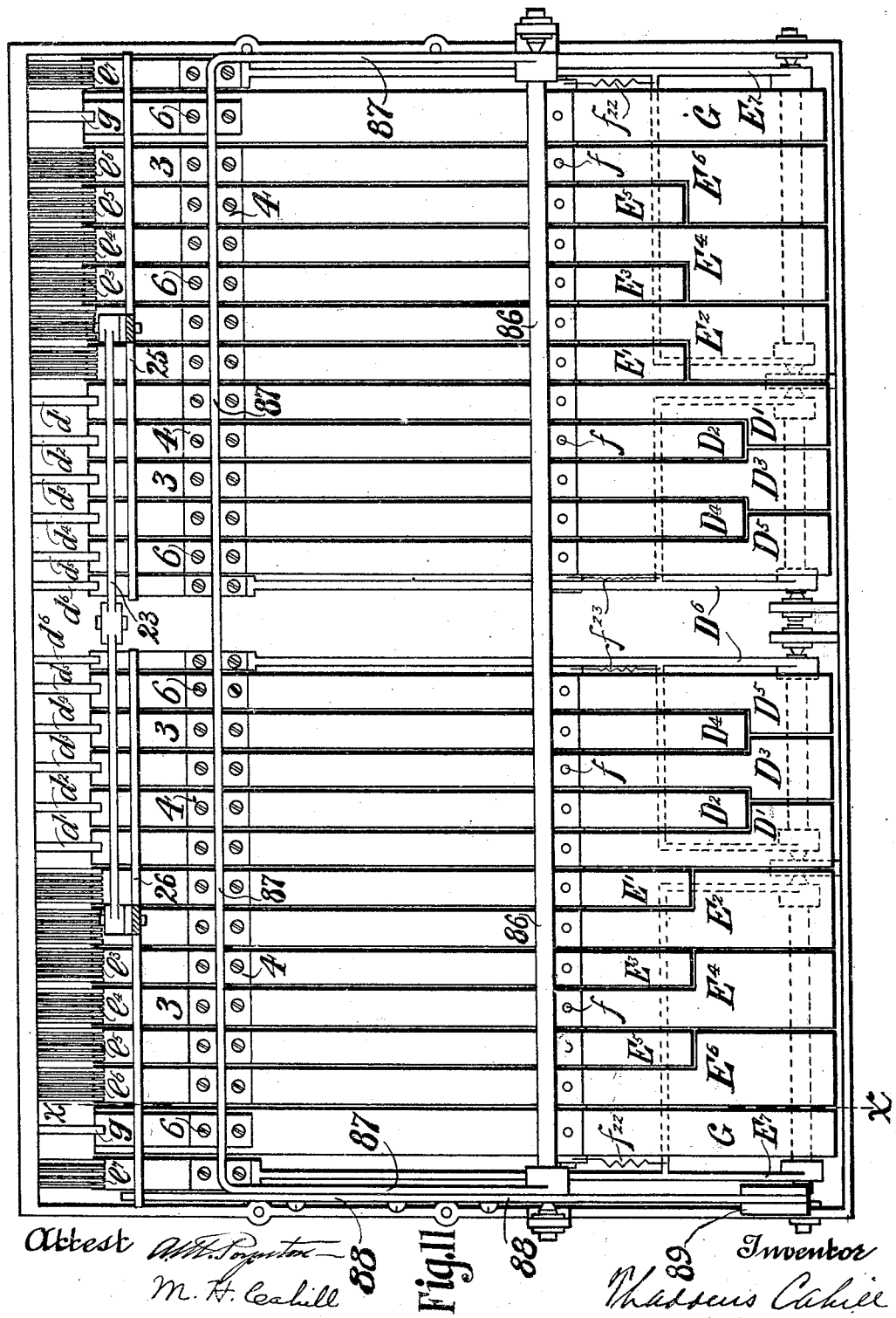

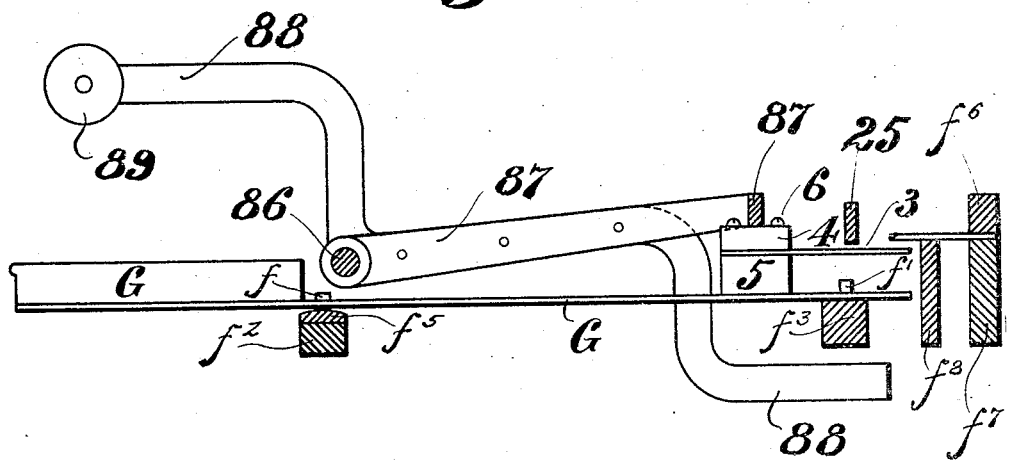

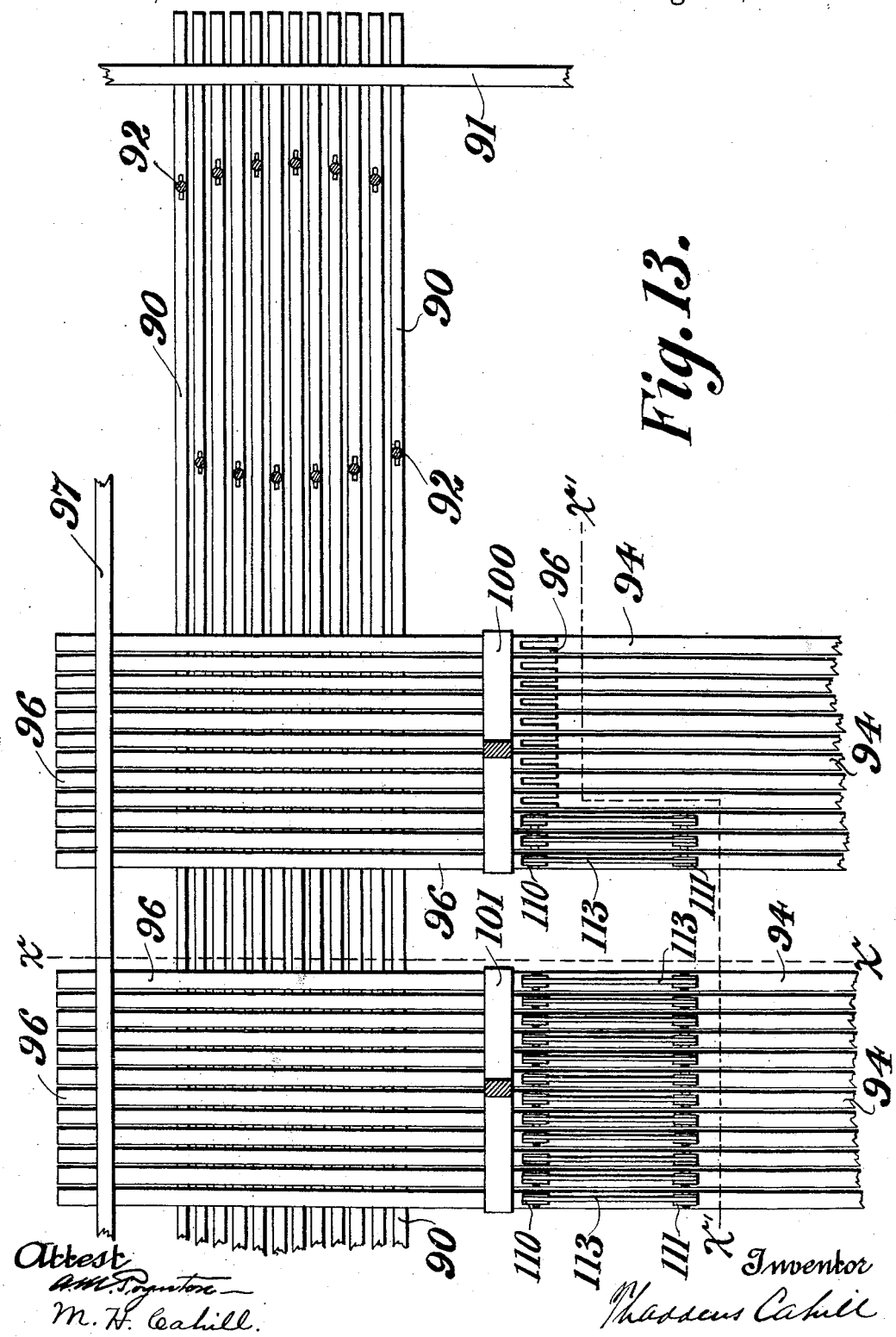

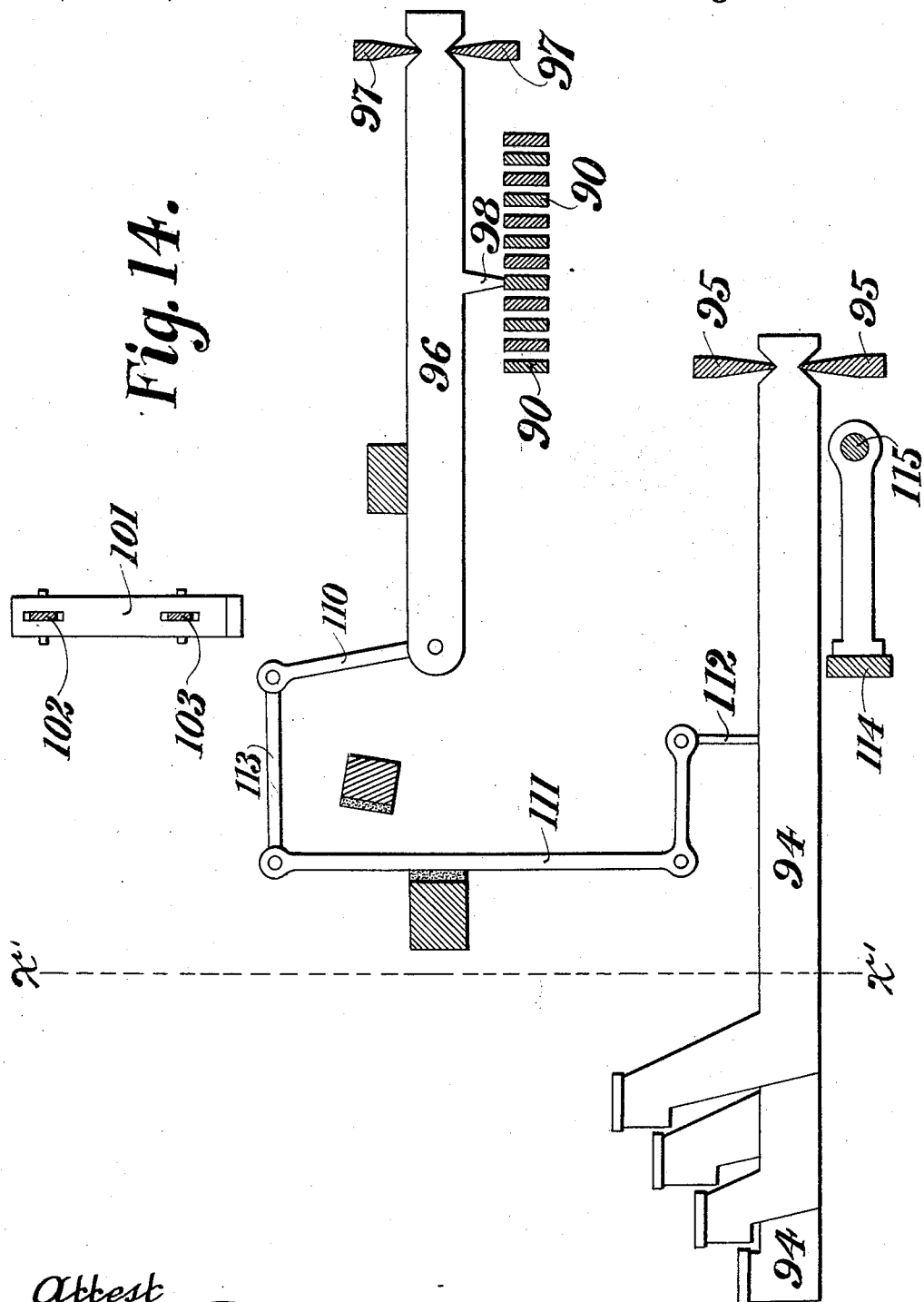

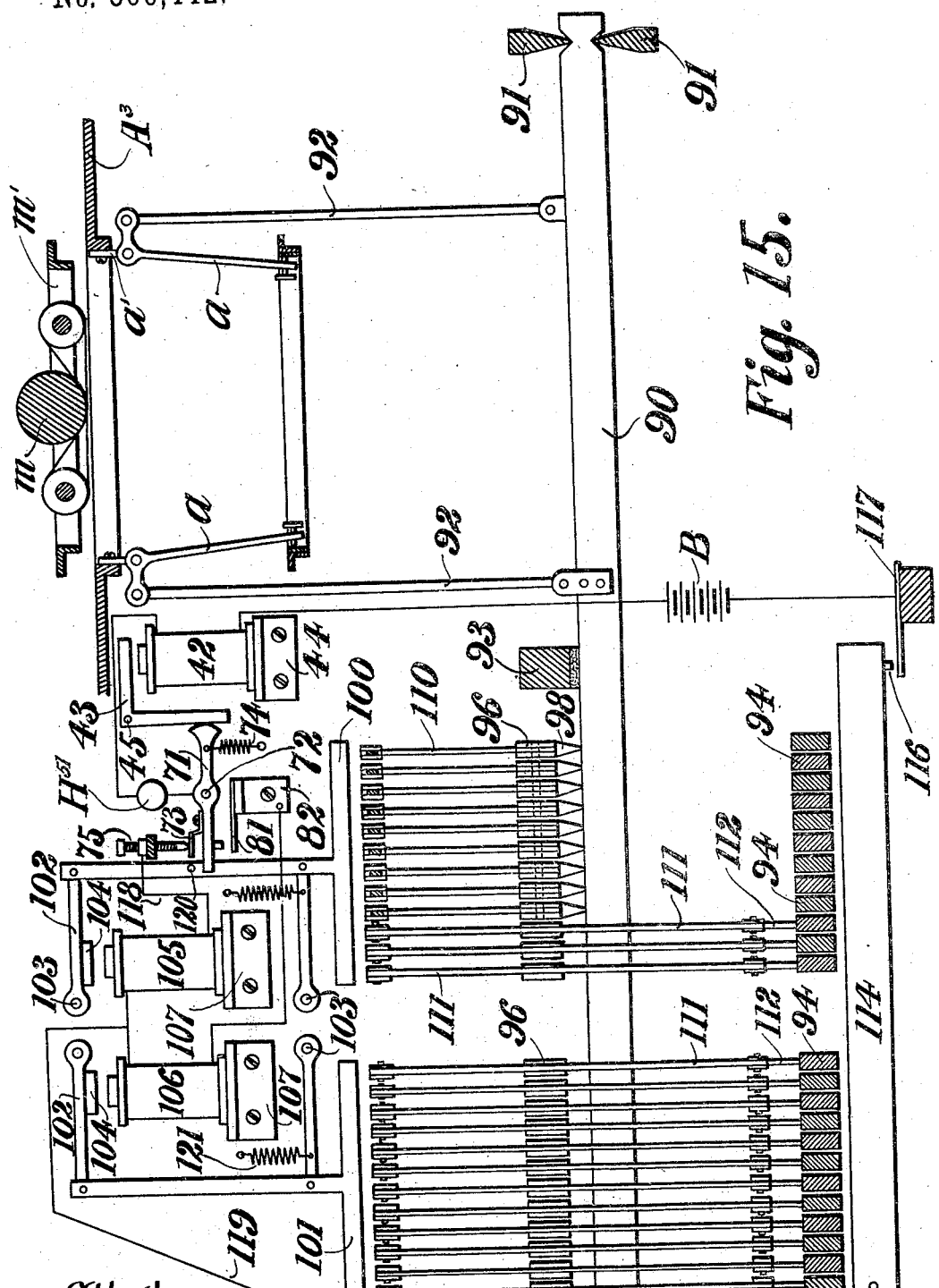

(No Model.)

T. CAHILL.
TYPE WRITING MACHINE.

No. 566,442. Patented Aug. 25, 1896.

Attest A. M. Poynter
M. H. Cahill

Inventor
Thaddeus Cahill

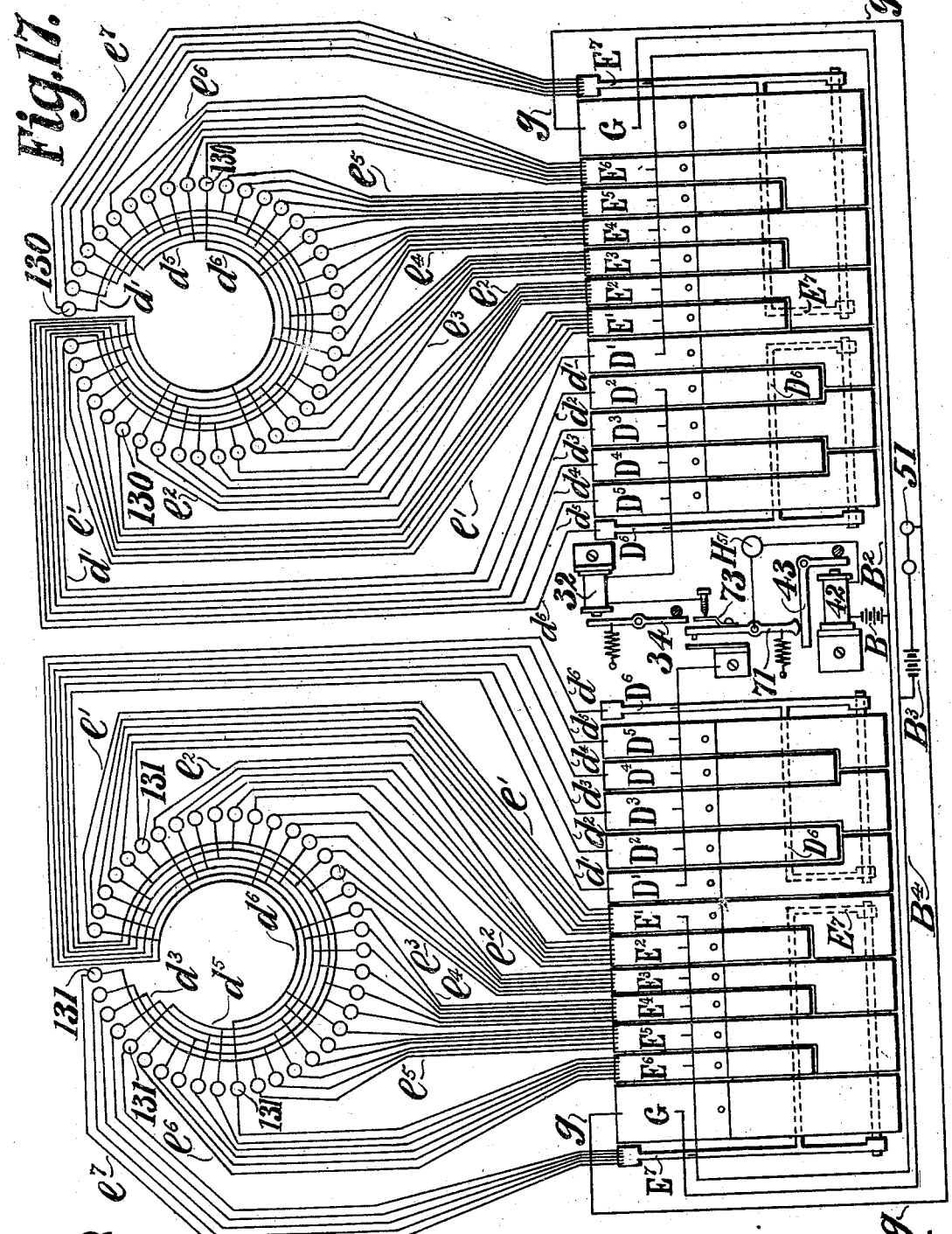

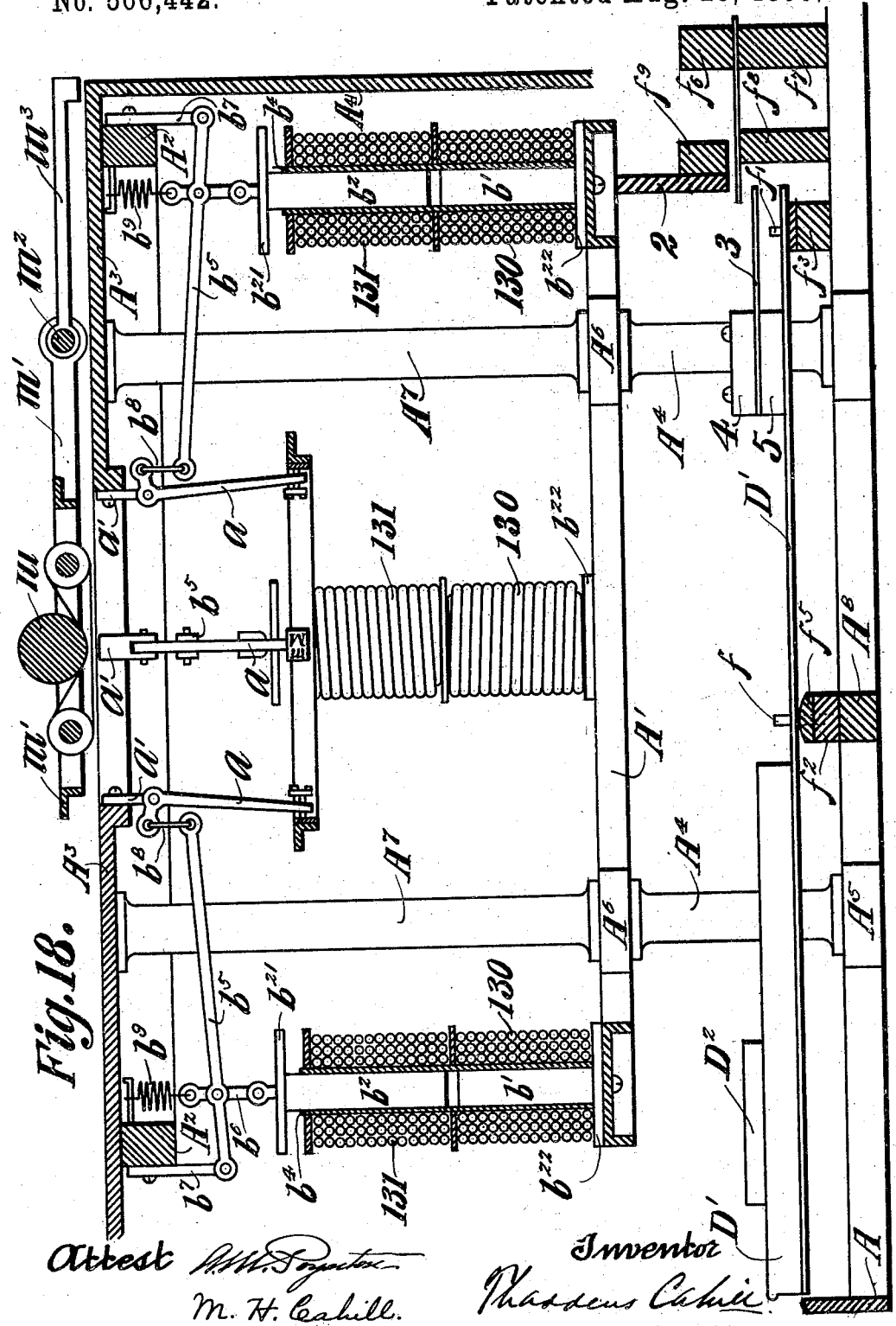

UNITED STATES PATENT OFFICE.

THADDEUS CAHILL, OF NEW YORK, N. Y.

TYPE-WRITING MACHINE.

SPECIFICATION forming part of Letters Patent No. 566,442, dated August 25, 1896.

Application filed January 4, 1896. Serial No. 574,359. (No model.)

*To all whom it may concern:*

Be it known that I, THADDEUS CAHILL, a citizen of the United States, and a resident of the city, county, and State of New York, residing temporarily at Washington, in the District of Columbia, have invented certain new and useful Improvements in Type-Writing Machines, Type-Setting Machines, and other Similar Instruments, of which the following is a specification.

The object of my invention is to increase the amount of work which can be done in a given time with an instrument of the kind before mentioned by enabling the operator to make two letters simultaneously; and my invention consists in the parts, improvements, and combinations hereinafter described and claimed.

I shall first describe my invention as applied to a type-writing machine, and will then point out how it may be used in type-setting machines and other similar instruments. The accomplishment of the object before mentioned, to wit, making two letters at the same time, has been attempted heretofore in a variety of ways. Thus in type-writing machines having type-forms, or "key-wheel" machines, as they are termed in the Patent-Office classification, it has been attempted (*a*) by furnishing the type-form with word-characters, as in the patent to Blickensderfer, No. 457,333, dated August 4, 1891, or the patent to Garner and Laganke, No. 375,062, dated December 20, 1887; (*b*) by furnishing the type-form with compound or double-letter characters, as in the patent to me, No. 531,904, dated January 1, 1895, and (*c*) by employing coöperating type-forms arranged so that they print consecutive letters of a word simultaneously at adjacent printing-points, as in the patent to Eckels, No. 466,490, dated January 5, 1892, or in the patent to me, No. 541,222, dated June 18, 1895; and in type-bar machines the same object has been attempted (*a*) by furnishing certain of the bars with word-characters; (*b*) by furnishing certain of the bars with compound or double-letter characters, and (*c*) by employing two sets of bars arranged in circular arcs, the bars of each set being arranged so that they strike to a printing-point common to such set, and the printing-points of the two sets being adjacent to each other and on the same line of printing, as in the patent to Orpen, No. 297,086, dated April 15, 1884. In employing word-characters, or double-letter characters, whether in machines of the type-form variety or of the type-bar variety, a moderate increase in the speed of operation necessarily involves a great increase in the complexity of the machine. Indeed, any very great increase in the number of characters, whether simple characters or compound characters, is for obvious reasons undesirable, if not impracticable, and yet a great number of word-characters or double-letter characters must necessarily be employed in order to effect any very great increase in speed. The other plans of making two letters at the same time, (*a*) by employing coöperating type-forms, printing consecutive letters at adjacent printing-points, and (*b*) by employing two sets of type-bars printing at adjacent printing-points, also involve a very material increase in the complexity of the machine in the number of moving parts, their weight, the distances through which they must be moved, and the power required to impel them. Such plans increase greatly the complexity of the machine, the power required to operate it, and the facility of breaking down.

My present invention differs radically from all the plans before mentioned. It proceeds upon a new principle. It is well known that good machines, both of the type-bar variety and of the type-form variety, are capable, so far as the mechanism of the machines themselves is concerned, of very rapid operation. They are capable ordinarily of writing from a hundred and fifty to two hundred words a minute, and could be made to write more rapidly. The difficulty is in the operator's making the necessary movements (to wit, a movement for each letter and another for each interverbal space) in succession with the requisite rapidity, and in exerting the greatly-increased force which such rapid movements of the type-bars or type-forms involve. I obviate or reduce these difficulties. The operator makes two letters by my invention at the same time; but the mechanism prints them in rapid succession, and the whole is so contrived in the preferred form that the power required to operate the print ing mechanism is furnished by a dynamo or battery, so that the operator has only to touch light keys, which, moving through small distances, close the necessary circuits. My invention is applicable equally to type-form machines and to type-bar machines, and it may be carried out either by electrical devices, which is my preferred form, or by mechanical devices without the aid of electricity. I shall first describe my preferred form, in which type-bars and electrical mechanism are employed, and after the preferred form has been made clear I shall describe other forms of my invention, and shall point out how it may be applied to other uses than in type-writing.

In many type-writing machines there is a key for every character. In other type-writing machines in common use each key serves for two or in some cases for three characters. In all these common types of machines, however, a large number of keys is employed. In some other types of machine a small number of keys is made to serve for a large number of characters. The machines patented to me by Letters Patent No. 502,700, dated August 8, 1893, No. 531,904, dated January 1, 1895, and No. 541,222, dated June 18, 1895, and the machine described in a pending application of mine, Serial No. 572,121, filed December 14, 1895, are examples of machines in which a few keys are made to print a large number of characters. Such devices, by which a small number of keys acting in various permutations or combinations is made to produce a large number of letters, each as desired, may properly be termed (and is sometimes in this specification termed) a "permutational letter-selecting device," or designated by other similar language.

Important features of my present invention are applicable equally to machines having a key for every character and to machines having a few keys serving for many characters; but as I employ two groups of keys, which are acted upon simultaneously by the operator, so that a letter is made on each group at the same time, it becomes very important to reduce the number of keys of each group to the smallest practicable number; and the preferred form of my invention illustrated in the drawings is so arranged and contrived that a small number of keys serves for each hand to print a large number of letters. In other words, I prefer to use, in the carrying out of my invention, permutational letter-selecting devices, and the combination of such devices with other parts, as set forth in the statement of claim at the end hereof, constitutes an important portion of my invention, but I do not limit myself to the use of permutational letter-selecting devices, for much of my invention may be practiced without them.

Figure 16:
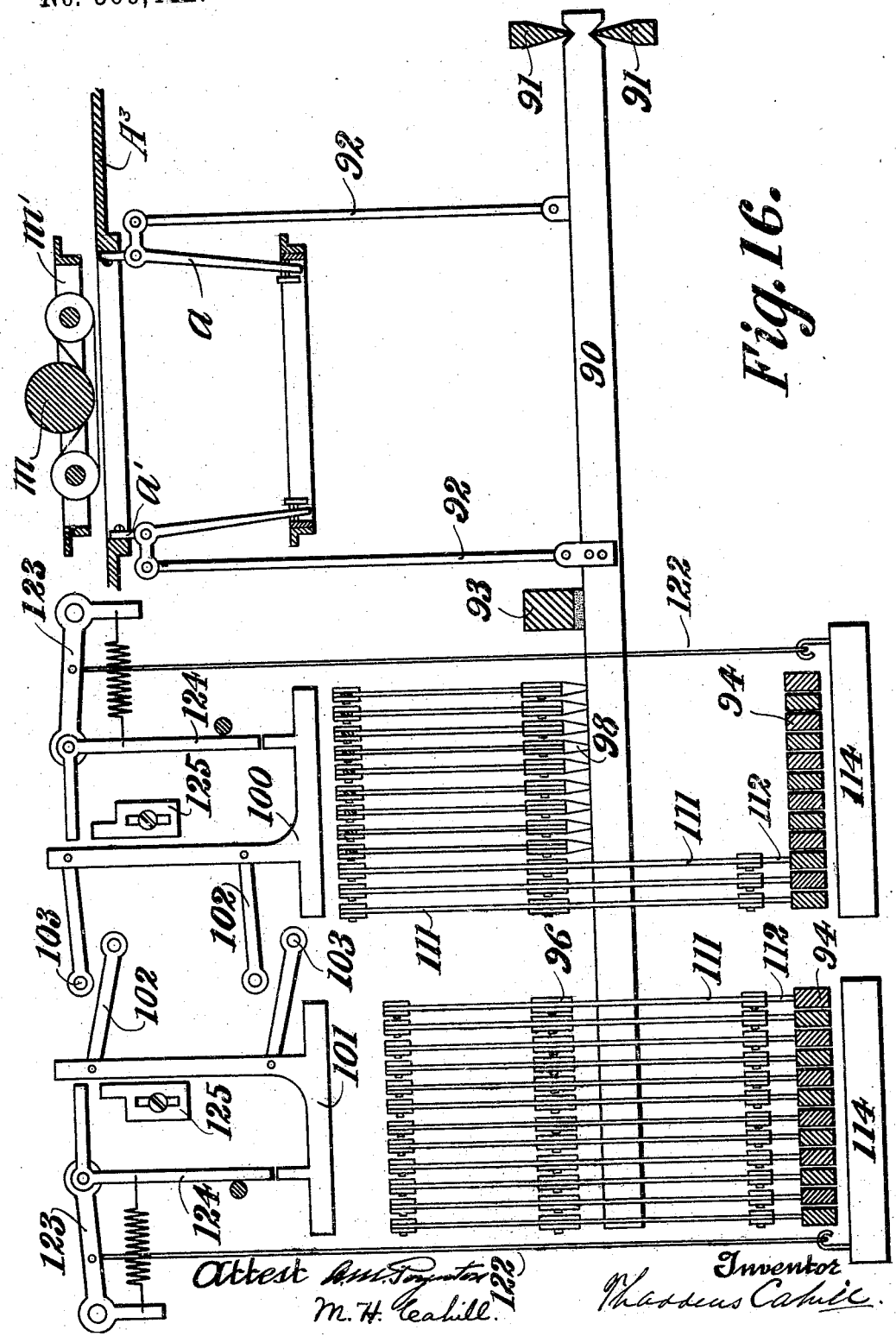

In the accompanying drawings, Figure 1 is a diagrammatic view with the keyboards in plan, illustrating the electrical connections of a set of keys and magnets employed in carrying out my invention, and in this figure mechanical details of construction and of form and position of parts are disregarded, in order to illustrate the electrical connections as simply as possible, and the major portion of the connection-changing device (elsewhere clearly illustrated) is entirely omitted. Fig. 2 is a plan view illustrating the mechanical arrangement of the keys, circuit-controlling frames, and coacting contact-pieces, and in this figure, as in Fig. 1, important portions of the circuit-changing device (elsewhere clearly illustrated) are omitted. Figs. $2^A$, $2^B$, and $2^C$ are sectional views, partly in elevation, on the lines $x\,x$, $x'\,x'$, and $x^2\,x^2$, respectively, Fig. 2. Fig. $2^A$ is intended to illustrate the relations subsisting between the various keys and the circuit-controlling frame $D^6$ and $E^7$, hereinafter described, and the construction of the keys, formed each partly of wood and partly of conducting metal. Fig. $2^B$ is intended to illustrate the relation between the various keys and the conducting-strips $f^4$ and $f^5$, hereinafter described; and Fig. $2^C$ is intended to illustrate the relations normally subsisting between the various keys and the circuit-closing frames $D^6$ and $E^7$ on the one hand and the contact-pieces with which they close circuit on the other hand, and particularly to make clear the fact that the various keys are normally out of connection with the corresponding contact-pieces, while the circuit-closing frames $D^6$ and $E^7$ are normally in connection with the contact-pieces corresponding to them, except as they are kept out of connection by the circuit-changing device hereinafter described. Fig. 3 is a sectional view, partly in elevation, through the center of a type-writing machine constructed according to the preferred plan of my invention, the plane of section being parallel to the length of the keys and transverse to the paper-carriage, and in this view a few only of the electromagnets, with the corresponding type-bars and intermediate parts, are illustrated, the major portion being omitted for greater clearness and convenience, and the major part of the connection-changing device is omitted also. Fig. 4 is a detail view, partly in section, partly in elevation, on the lines $x^2\,x^2$, Figs. 2 and 3, illustrating the connection-changing device hereinbefore referred to and hereinafter described. Fig. 5 is a detail rear elevation illustrating the spacing mechanism. Figs. 6, 7, and 8 are detail views illustrating the construction of the main frame which I prefer to use in applying my invention to a type-writing machine. Fig. 6 is a top view illustrating the top plate of the machine, with the ring attached to the top plate and serving to support the flanges or hangers by which the levers hereinafter described, operated by the electromagnets, and serving to transmit motion to the type-bars are supported. Fig. 7 is a detail top view illustrating the magnet-carrying ring attached to the bed-plate; and Fig. 8 is a detail view, partly in elevation, partly in section, illustrating the construction by which the principal parts of the main frame are bound together. Figs. 1 to 8, inclusive, illustrate the preferred construction of my invention as applied to a type-writing machine. The remaining figures illustrate modified and alternative constructions. Fig. 9 is a diagrammatic view similar to Fig. 1 and illustrating a modified construction in which keyboard is provided with a separate key for each type-bar operating electromagnet controlled by such keyboard. This view illustrates, diagrammatically, the arrangement of the circuits. Fig. 10 is a detail elevation illustrating, diagrammatically, a modified circuit-changing device suitable for use with a simplified arrangement of electric circuits, such as that of Fig. 9. Fig. 11, which is a top view, and Fig. 12, which is a detail sectional elevation on the line $x$ $x$, Fig. 11, illustrate a modification of the circuit-changing device such that the mechanical movement which effects the changing of the circuits is effected directly by the force applied to the keys instead of being effected by a key-controlled electric circuit, as in the preferred device. Figs. 13, 14, and 15 are diagrammatic views illustrating a modification in which two electromagnets only are employed for printing, one being controlled by the right-hand keys and the other being controlled by the left-hand keys, instead of employing a multiplicity of magnets, as in the before-described devices. Fig. 13 is a diagrammatic plan view, partly in section, illustrating among other things the relations subsisting between the two keyboards and the type-bar-connected levers, which levers last mentioned correspond with the key-levers of such machines as the "Remington." Fig. 14 is a diagrammatic sectional view in elevation on the line $x$ $x$, Fig. 12, illustrating the arrangement of parts by which a key is connected with the corresponding power-operated lever; and Fig. 15 is a diagrammatic sectional elevation on the line $x'$ $x'$, Figs. 13 and 14, illustrating the power arrangement and the electrical connections. Fig. 16 is a view similar to Fig. 15, but illustrating a modified construction in which a mechanical arrangement of momentum-pieces is substituted for the electromagnetic power devices. Fig. 17 is a diagrammatic view similar to Fig. 1, illustrating a modification hereinafter described. Fig. 18 is a view similar to Fig. 3, illustrating a modification hereinafter described.

In all the various figures the aim has been to make clear the essential principles of the invention and the important features of construction, and to do this the better non-essential and immaterial details of construction, which form no part of my invention, and of which one or more suitable forms are already well known in the art, have been disregarded or omitted, and details of form, size, and proportion, even of the important parts, have been varied, altered, or departed from in many cases to illustrate more clearly the essential principles of the invention; and in several cases where there is a multiplicity of similar parts a few only have been illustrated. This is particularly true of the devices illustrated in Figs. 13, 14, 15, and 16. In these devices there would be in practice a large number of keys in a set, (preferably about forty in the right-hand set and somewhat more than one-half that number in the left-hand set,) only a few of which are shown in the drawings, the major part being omitted to avoid the cramping and obscurity which would necessarily result from showing so many parts in so small a space. In brief, the drawings are not made to scale, and non-essential mechanical details and details of number, size, form, and proportion are constantly sacrificed for the sake of greater clearness in illustrating the essential principles of the invention and the leading features of construction.

My preferred form of type-writing machine, as illustrated in the drawings, consists, essentially, of ($a$) a multiplicity of electromagnets; ($b$) two groups or sets of keys, one serving for the right hand and the other serving for the left hand, controlling said electromagnets, each group of keys consisting of a number of keys small in comparison with the number of magnets controlled thereby; ($c$) type-bars operated by the electromagnets; ($d$) connections intermediate each group of keys and the electromagnets before mentioned; ($e$) a connection-changer whereby the operative connections between the electromagnets and the different sets of keys are changed or shifted in such a manner that the key or keys depressed of one set are first connected with the electromagnets and battery and then this connection is broken, and the key or keys depressed of the other set are connected in turn with the electromagnets and battery, so that, though the keys of the two sets are depressed simultaneously, they print successively; ($f$) the usual paper-carriage, and ($g$) suitable spacing mechanism. Some suitable form of ribbon mechanism is also employed, but, as any suitable form may be used and many forms are known, I have not burdened the drawings with any particular form. Such is the preferred form of type-writing machine; but no very great importance is attached to this preferred construction, and any one of a number of others, as will be seen more clearly when the whole of this specification has been perused, may be used instead. The principal thing, however, that is new, so far as this specification is concerned, in the device last above mentioned, is the feature of employing two sets of keys and of making the letters successively from keys depressed simultaneously.

The arrangement of type-bars, disposed around a circle and arranged so that they strike to a common center, and the carriage mechanism are old and well known in the art. The idea of operating the type-bars by means of magnets is also old in the art. The arrangement of a single set of keys, few in number, controlling a set of magnets, large in number, as illustrated in the drawings, is not new in the present specification and is not claimed herein. It forms the subject-matter of another application of mine for improvements in type-writing machines and other key-operated instruments, filed December 14, 1895, Serial No. 572,121; and the same is to a great extent true of the spacing mechanism herein illustrated and described. While, therefore, it will be necessary to an understanding of the device which I consider best for the carrying out of my invention to describe briefly a great part of a complete operative machine, I wish it to be clearly understood at the outset that the principal novel features of the present application, so far as a type-writing machine is concerned, are those which relate to the use of two sets of keys or other suitable letter-selecting devices, actuated by the operator simultaneously and serving to produce their letters in rapid succession.

With this preliminary description I shall now proceed to describe the preferred device for carrying out my invention. It will be borne in mind, however, that it is not the peculiar features of the preferred device which I am now about to describe in detail, but rather the essential parts, improvements, and combinations set forth in the statement of claim at the end hereof, in which my invention consists, to which I attach importance, and for which I desire protection.

The main frame consists, essentially, of (a) a bed-plate marked A; (b) a magnet-carrying ring A', preferably of non-magnetic material, arranged concentric with the circle of type-levers; (c) another ring $A^2$, to which the flanges are attached which support the multiplying-levers operated by the electromagnets and serving to transmit motion from the electromagnets to the type-levers; the top plate $A^3$ of the machine, to which top plate the various type-levers, the carriage, &c., are connected in the usual manner, and (e) a bar or frame 2, attached to the bed-plate A and serving to support various parts belonging to the connection-changer hereinafter described. The top plate $A^3$ has at the back a downward extension $A^{41}$, which serves to support the spacing mechanism. Columns or standards $A^4 A^4$, fastened by bolts or machine-screws to lugs $A^5 A^5$, projecting from the bed-plate A, and to other lugs $A^6 A^6$, projecting inwardly from the magnet-carrying ring A', serve to support the magnet-carrying ring A' and its magnets. The ring $A^2$, which supports the levers connecting the magnets with their proper type-levers, is screwed fast to the top plate $A^3$, and the top plate is supported by columns $A^7 A^7$, attached fast to the lugs $A^6 A^6$ of the magnet-carrying ring A' below and to the top plate itself above. Thus the main frame is bound together. The details of construction of the main frame, however, it is to be understood, are entirely immaterial so far as the principle of my invention is concerned.

The type-bars $a$ $a$, Fig. 3, each of which carries an upper-case and a lower-case character, are supported by means of flanges or hangers $a'$ $a'$, of any suitable construction, screwed fast to the top plate in the usual fashion. The electromagnets $b$ $b$ consist each, essentially, of a fixed core $b'$, bolted fast to the magnet-carrying ring, a movable core or armature $b^2$ and a coil of insulated wire $b^3$, surrounding the parts $b'$ and $b^2$. The wire is wound upon a hollow tube $b^4$, provided with retaining-heads. The armature $b^2$ is connected with a multiplying-lever $b^5$ by a link $b^6$. Said multiplying-lever $b^5$ is supported by a flange or hanger $b^7$, screwed fast to the ring $A^2$, and is connected by a link $b^8$ with the corresponding type-carrying lever $a$. The whole arrangement is such that when the magnet is energized by passing an electric current through the coil $b^3$ the armature $b^2$ is attracted by the fixed core $b'$ and moves toward it, so moving the multiplying-lever $b^5$ and pulling upon the link $b^8$, which in turn pulls down the short end of the type-lever $a$ and throws the type up forcibly against the paper carried by the paper-roll $m$. A contractile spring $b^9$ serves to return the parts to their normal positions when the circuit of the magnet is broken.

I prefer to employ the arrangement of magnet illustrated in the drawings, having a fixed core and a movable cylindrical armature, both lying inside the energizing-coil, for when properly constructed this form of electromagnet reduces the disadvantageous magnetic leakage to a minimum, gives a pull through a considerable distance, and having its magnetic circuit largely of air loses its magnetism instantly the circuit is broken, and so works with great rapidity. I have found it peculiarly advantageous for operating the type-bars; but any other suitable form of electromagnet whatever may, of course, be substituted for it. The enlarged heads $b^{21}$ and $b^{22}$ of the fixed core $b'$ and the armature $b^2$ are made large, so that they give a good return-circuit through air for the magnetic flux or lines of force. By this arrangement the total reluctance of the magnetic circuit is kept within moderate limits, and at the same time the magnetic circuit, including an air-return path for the flow of force, the device operates with great rapidity.

With this brief preliminary description of the mechanism, we will now consider the arrangement of the electric circuits and the controlling-keys. (See particularly Figs. 1 and 2.) There are two sets or groups of keys, one of which is arranged in convenient position to be operated by the right hand and the other of which is arranged in convenient position to be operated by the left hand. The right-hand set and the left-hand set are essentially similar. I shall first describe the arrangement and connections of the right-hand set, and after that will briefly explain the arrangement, &c., of the left-hand set. The keys of the right-hand set (and the same is equally true of the keys of the left-hand set) fall naturally into two groups. Those of the first group are marked $D'$, $D^2$, $D^3$, $D^4$, and $D^5$ and those of the second group are marked, respectively, $E'$, $E^2$, $E^3$, $E^4$, $E^5$, and $E^6$. A circuit-controlling frame $D^6$ lies underneath the keys $D'$, $D^2$, $D^3$, $D^4$, and $D^5$, so that it is operated by them, and a similar circuit-controlling frame $E^7$ lies underneath the keys $E'$, $E^2$, $E^3$, $E^4$, $E^5$, and $E^6$, so that it is operated by them. The magnets $b$ $b$, &c., (of which there are forty-one in the device figured in the drawings,) when considered with regard to the keys $E'$ $E^2$ $E^3$ $E^4$ $E^5$ $E^6$ and the frame $E^7$ fall naturally into seven groups, corresponding, respectively, with the seven parts $E'$, $E^2$, $E^3$, $E^4$, $E^5$, $E^6$, and $E^7$, and the magnets of each such group have each one terminal arranged in juxtaposition to the key $E'$ $E^2$ $E^3$, &c., or frame $E^7$, (as the case may be,) corresponding to such group, so that each of the keys $E'$ $E^2$, &c., and the frame $E^7$ can close circuit with such magnets. The terminal wires mentioned of the magnets corresponding to the key $E'$ are marked $e'$, those corresponding to the key $E^2$ are marked $e^2$, those corresponding to the key $E^3$ are marked $e^3$, those corresponding to the key $E^4$ are marked $e^4$, those corresponding to the key $E^5$ are marked $e^5$, those corresponding to the key $E^6$ are marked $e^6$, and those corresponding to the frame $E^7$ are marked $e^7$. When considered with regard to the keys $D'$ $D^2$ $D^3$ $D^4$ $D^5$ and the frame $D^6$, the magnets $b$ $b$ fall naturally into six groups, corresponding, respectively, to the six circuit-controllers $D'$, $D^2$, $D^3$, $D^4$, $D^5$, and $D^6$; and all the magnets of each such group have one terminal connected with a wire leading to the corresponding keys $D'$ $D^2$ $D^3$ $D^4$ $D^5$ or frame $D^6$. The wires $d'$, $d^2$, $d^3$, $d^4$, $d^5$, and $d^6$ correspond, respectively, with the parts $D'$, $D^2$, $D^3$, $D^4$, $D^5$, and $D^6$, and said wires have each one end lying in proximity to the corresponding key $D'$ $D^2$ $D^3$ $D^4$ $D^5$ or frame $D^6$, so that each of the parts last named serves to make and break connection with the corresponding wire $d'$ $d^2$, &c.; and the magnets corresponding to the key $D'$ have each one terminal connected with the wire $d'$, the magnets corresponding to the key $D^2$ have each one terminal connected with the wire $d^2$, the magnets corresponding with key $D^3$ have each one terminal connected with the wire $d^3$, the magnets corresponding with the key $D^4$ have each one terminal connected with the wire $d^4$, the magnets corresponding with the key $D^5$ have each one terminal connected with the wire $d^5$, and the magnets corresponding with the frame $D^6$ have each one terminal connected with the wire $d^6$.

The circuit-controllers marked, respectively, $E'$, $E^2$, $E^3$, $E^4$, $E^5$, $E^6$, and $E^7$ may be termed, for convenience sake, the "E" group; and the circuit-controllers $D'$, $D^2$, $D^3$, $D^4$, $D^5$, and $D^6$ may, in like manner, be termed the "D" group. Every one of the magnets $b$ $b$, &c., it will be seen, has one of its terminals in make-and-break relation with some one of the circuit-controllers of the D group and its other terminal in make-and-break relation with some one of the circuit-controllers of the E group. All of the keys $D'$ $D^2$ $D^3$ $D^4$ $D^5$ and the frame $D^6$ are connected with a conductor $B'$, leading to the battery B, and in like manner all the keys $E'$ $E^2$ $E^3$ $E^4$ $E^5$ $E^6$ and the frame $E^7$ are connected with another conductor $B^2$, leading to said battery B, the spacing-magnet $H^{31}$ hereinafter described, the detent-magnet 42, and the connection-changing magnet 32 being also included in the circuit. The six groups of magnets having terminals connected, respectively, with the keys $E'$, $E^2$, $E^3$, $E^4$, $E^5$, and $E^6$, as figured in the drawings, include six magnets each, and the six magnets of each group are connected, respectively, one with the wire $d'$, leading to key $D'$, one with the wire $d^2$, leading to key $D^2$, one with wire $d^3$, leading to key $D^3$, one with the wire $d^4$, leading to key $D^4$, one with the wire $d^5$, leading to key $D^5$, and one with the wire $d^6$, leading to the circuit-controlling frame $D^6$. The group of magnets having terminals connected with circuit-controlling frame $E^7$ contains only five magnets, and these have their terminals connected, respectively, one with the wire $d'$, another with the wire $d^2$, another with the wire $d^3$, another with the wire $d^4$, and another with the wire $d^5$. In other words, the group of magnets connected with the frame $E^7$ differs from the groups connected with the keys $E'$, $E^2$, $E^3$, $E^4$, $E^5$, and $E^6$, in that it has no magnet connected with the wire $d^6$, controlled by the frame $D^6$. In their normal positions the frame $D^6$ makes connection with the wire $d^6$, and the frame $E^7$ makes connection with the wire $e^7$; but when any of the keys $D'$, $D^2$, $D^3$, $D^4$, or $D^5$ is depressed it rocks the frame $D^6$, so that it breaks connection with its wire $d^6$, and when any of the keys $E'$, $E^2$, $E^3$ $E^4$, $E^5$, or $E^6$ is depressed it rocks the frame $E^7$, so that said frame breaks connection with its wire $e^7$. Each of the keys $D'$, $D^2$, $D^3$, $D^4$, and $D^5$, on the contrary, when in its normal position, is out of connection with its wire $d'$ $d^2$, &c., (as the case may be,) but when acted on by the operator closes circuit with its wire, the key $D'$ closing circuit with wire $d'$, key $D^2$ with wire $d^2$, key $D^3$ with wire $d^3$, key $D^4$ with wire $d^4$, and key $D^5$ with wire $d^5$, as before pointed out. In like manner the keys $E'$, $E^2$, $E^3$, $E^4$, $E^5$, and $E^6$, when in their normal positions, do not make connection with the wires $e'$ $e^2$ $e^3$, &c., corresponding to them; but when any of these keys is acted on by the operator it makes connection with the corresponding wires belonging to the corresponding group of magnets, the various keys $E'$, $E^2$, $E^3$, $E^4$, $E^5$, and $E^6$ making connection, respectively, with the wires $e'$, $e^2$, $e^3$, $e^4$, $e^5$, and $e^6$, as before said.

The printing of the different letters is effected by energizing the corresponding magnets, that is to say, by energizing the magnets connected, respectively, with the different type-levers $a$ $a$ $a$, which carry the letters to be printed. To energize any magnet, it is thrown in circuit with the battery B, and each magnet is in circuit with the battery when the particular circuit-controller of the E group ($E'$, $E^2$, $E^3$, $E^4$, $E^5$, $E^6$, or $E^7$, as the case may be) which corresponds to such magnet makes connection with one terminal wire of said magnet, and when also the particular circuit-controller ($D'$, $D^2$, $D^3$, $D^4$, $D^5$, or $D^6$, as the case may be) of the D group corresponding to such magnet makes connection with the corresponding wire ($d'$, $d^2$, $d^3$, $d^4$, $d^5$, or $d^6$, as the case may be) with which the other terminal of said magnet is connected.

If I were to substitute for the frame $D^6$ a key similar to the other keys $D'$ $D^2$, &c., and for the frame $E^7$ a key similar to the other keys $E'$ $E^2$, &c., it would be necessary always to depress two keys to energize any magnet or to print any letter, and every different combination of two keys, belonging one to the D group and the other to the E group, of which there would then be forty-two in all, would energize a different magnet. The office of the frames $D^6$ and $D^7$ is to obviate the necessity of depressing two keys to close circuit for a number of magnets corresponding to and serving to print the most frequently occurring letters. Thus the frame $D^6$ makes connection through the wire $d^6$ with one magnet in each of the six groups controlled, respectively, by the keys $E'$, $E^2$, $E^3$, $E^4$, $E^5$, and $E^6$, so that each of these keys may be depressed by itself alone, and when so depressed will close circuit through that magnet of its group which has one terminal connected with the wire $d^6$. In like manner the frame $E^7$ makes connection through the wires $e^7$ with one magnet in each of the five groups connected, respectively, with the wires $d'$, $d^2$, $d^3$, $d^4$, and $d^5$ and controlled, respectively, by the keys $D'$, $D^2$, $D^3$, $D^4$, and $D^5$, so that each of these keys may be depressed by itself alone, and when so depressed will close circuit through that magnet of its group which has one terminal connected with the frame $E^7$. Thus every key is made capable of printing a letter when depressed by itself alone, and a large number of the most frequently occurring letters, forming in the aggregate more than three-quarters of the letters in an average page, are made by the depressing of keys singly. The other and less frequently occurring letters and other characters are made by depressing simultaneously two keys, one belonging to the D group and the other belonging to the E group, and when any two keys, belonging one to the D group and the other to the E group, are depressed simultaneously that magnet is energized which has one terminal connected with one key depressed and the other terminal connected with the other key depressed, and it is to be remembered, as before pointed out, that depressing any of the keys of the D group breaks the connection between the frame $D^6$ and the wire $d^6$, and depressing any of the keys of the E group in like manner breaks the connection between the frame $E^7$ and its wire $e^7$.

The different keys and the different combinations of keys may be made to print the different combinations of letters and other characters in any order desired. In other words, to each key and to each combination of keys may be assigned such letter or other character as the constructor thinks fit. The principle is simple, the variations endless. Probably no two designers, acting independently of each other, would assign the various characters to the different keys in exactly the same order; but whatever plan of assignment is pursued the whole arrangement should be in general such that the most frequently occurring letters will be produced by the keys or combinations of keys most readily depressed, a regard being had to the normal positions of the hand with reference to the various keys. In making any desired arrangement one has only to remember the following simple rules: To produce any letter by a given key acting individually, place the letter desired on the type-lever controlled by that particular magnet which is energized by depressing such key alone. To produce any letter by a combination of two keys, belonging one to the D group and the other to the E group, place such letter on the type-lever controlled by that particular magnet which has one terminal connected with the particular D-group key desired and the other terminal connected with the particular E-group key desired, so that it is energized by the depressing of such two keys simultaneously.

Having thus described the arrangement of the electrical circuits, it will now be proper to describe the mechanical construction and arrangement of the keys and the contact-pieces (heretofore referred to for simplicity's sake, and illustrated in the diagrammatic view, Fig. 1, simply as terminal wires) with which they make and break circuit. The keys, as illustrated in the drawings, (see particularly Figs. 2, $2^A$, $2^B$, $2^C$, and 3,) are preferably formed each of a lower conducting metal strip and an attached wooden portion, which the operator touches. A contact-spring 3 is attached to the key, being clamped between conducting-pieces 4 and 5 by screws 6 6, which pass through the pieces 4 and 5 and contact-spring 3, down into the metal-strip part of the key. Contact-springs

3 3 are attached to the frames $D^6$ and $E^7$ in the same manner as to the keys. The keys, as illustrated in the drawings, are centered upon pins $f$ $f$ and held from lateral displacement by guide-pins $f'$, after the fashion common in pianos. The pins $f$ $f$ are driven into a wooden bar $f^2$ and the pins $f'$ are driven into a bar $f^3$. The wooden bar $f^2$ is attached to the cross-rib $A^3$ of the bed-plate A. Two conducting metal strips $f^4$ and $f^5$, insulated from each other, are placed on top of the bar $f^2$ and are connected with opposite poles of the battery B by wires $B'$ and $B^2$. The keys $E'$, $E^2$, $E^3$, $E^4$, $E^5$, and $E^6$ rest down upon the conducting-strip $f^4$, so that they are electrically connected with it, and the keys $D'$, $D^2$, $D^3$, $D^4$, and $D^5$ rest down upon the conducting-strip $f^5$, so that they are electrically connected with it. Conducting-wires $f^{22}$ and $f^{23}$, respectively connected with the metal strips $f^4$ and $f^5$ and with the frames $D^6$ and $E^7$, serve to establish electrical connection between the strips $f^4$ and $f^5$, respectively, and the frames $D^6$ and $E^7$, respectively. The terminal wires $d'$, $d^2$, $d^3$, $d^4$, $d^5$, and $d^6$ (corresponding, respectively, with the keys $D'$ $D^2$ $D^3$ $D^4$ $D^5$ and frame $D^6$) and the groups of terminal wires $e'$, $e^2$, $e^3$, $e^4$, $e^5$, $e^6$, and $e^7$ (corresponding, respectively, with the keys $E'$ $E^2$ $E^3$ $E^4$ $E^5$ $E^6$ and frame $E^7$) are preferably made flat of elastic material, non-oxidizable in itself, or covered with non-oxidizable material, or furnished with contact points or surfaces of non-oxidizable material, such as platinum. Obviously the wires with which the coils $b^8$ $b^8$ are best wound are not suitable for this purpose, and some other suitable material should be soldered to such terminals at the ends where contact is made with the keys. The terminals $d'$, $d^2$, $d^3$, $d^4$, $d^5$, $d^6$, $e'$, $e^2$, $e^3$, $e^4$, $e^5$, $e^6$, and $e^7$ are clamped tightly between insulating-bars $f^6$ and $f^7$, and they are all insulated from each other, except as they are connected through their respective magnets. The terminals $d'$, $d^2$, $d^3$, $d^4$, $d^5$, $e'$, $e^2$, $e^3$, $e^4$, $e^5$, and $e^6$ being thus in make-and-break relation with the keys $D'$, $D^2$, $D^3$, $D^4$, $D^5$, $E'$, $E^2$, $E^3$, $E^4$, $E^5$, and $E^6$ normally rest down upon the insulating-bar $f^9$. Their respective keys, with the attached contact-springs 3 3, lie just below them, so that when a key is acted on by the operator it moves but a short distance, when its attached contact-spring 3 comes in contact with the corresponding contact-piece or terminal wire $d'$, $d^2$, $d^3$, $d^4$, $d^5$, $e'$, $e^2$, $e^3$, $e^4$, $e^5$, or $e^6$, as the case may be, closing circuit with it and pressing it up against the insulating stop-rail $f^9$. The arrangement is such, it will be seen, as before stated, that the various keys $D'$, $D^2$, $D^3$, $D^4$, $D^5$, $E'$, $E^2$, $E^3$, $E^4$, $E^5$, and $E^6$, when in their normal positions, do not make connection with the corresponding terminal wires $d'$ $d^2$ $d^3$ $d^4$ $d^5$ $e'$ $e^2$ $e^3$ $e^4$ $e^5$ $e^6$, but do make connection when pressed upon by the operator. The arrangement of the frames $D^6$ and $E^7$, it should be carefully observed, is quite different. They are normally spring-pressed up by springs, (not shown,) so that they rest against the corresponding contact-pieces or terminal wires $d^6$ and $e^7$, closing circuit with them, the whole arrangement being such, as before pointed out, that any of the keys of the D group, when acted upon, serves to rock the frame $D^6$, so that it breaks connection with the corresponding wire $d^6$, and in like manner the different keys of the E group, when acted upon, serve to rock the frame $E^7$, so that it breaks connection with the corresponding wires $e^7$. Each of the keys of the D group, it will thus be seen, serves when depressed to break the connection between the frame $D^6$ and terminal wire $d^6$ and to establish its own proper connection, and each of the keys of the E group, in like manner, serves when depressed to break the connection between the frame $E^7$ and the corresponding terminal wires $e^7$ and to establish its own proper connection.

It is to be understood, as before mentioned, that the arrangement of a set of type-levers, a set of controlling-magnets, and a single set of keys $D'$, $D^2$, $D^3$, $D^4$, $D^5$, $E'$, $E^2$, $E^3$, $E^4$, $E^5$, and $E^6$, with the frames $D^6$ and $E^7$ and the electrical connections $d'$, $d^2$, $d^3$, $d^4$, $d^5$, $d^6$, $e'$, $e^2$, $e^3$, $e^4$, $e^5$, $e^6$, and $e^7$, &c., hereinbefore described, are not new in this present application, but form the subject-matter of a prior application, Serial No. 572,171, filed December 14, 1895, by me. I describe them here, however, because without an understanding of them the operation of the rest of my invention, as the same is embodied in the preferred form of device, could not be easily understood. I shall now proceed to describe those parts of the device figured in the drawings which are peculiar to my present invention.

In addition to the set of keys for the right hand there is a set of keys for the left hand also. The left-hand keys are similar to the right-hand keys and similarly marked. The wires $d'$, $d^2$, $d^3$, $d^4$, $d^5$, $d^6$, $e'$, $e^2$, $e^3$, $e^4$, $e^5$, $e^6$, and $e^7$, which connect the various magnets $b$ $b$, &c., with the right-hand keys branch and serve to connect the left-hand keys also with the same set of magnets $b$ $b$ and in the same manner. The conducting-wires $B'$ and $B^2$ branch in like manner, so that they connect the D-group keys and the E-group keys of both sets with the battery, a resistance $r$ being thrown in on the left-hand side equal in ohmage to the magnet 32 on the right-hand side. All that has been said in reference to the right-hand keys and their arrangement and connection applies equally to the left-hand keys, their arrangement and connections. In other words, in the preferred construction illustrated diagramnatically in Fig. 1, the right-hand keys and the left-hand keys control parallel circuits, and each pair of corresponding circuits, belonging one to the right-hand set and the other to the left-hand set, has the coil $b^8$ of the corresponding magnet as a common conducting portion.

This is a very convenient arrangement and an important feature of my invention, for by means of it a single set of coils is made to serve for the circuits of the two sets of keys; but it is not indispensable, as will be seen hereinafter, to the carrying out of other parts of my invention. With the preferred construction the main practical difference between the right-hand keys and the left-hand keys is that the right-hand keys are made to make their letter first and the left-hand keys to make their letter instantly thereafter, though of course the order might be reversed. What I mean is that if a key or combination of keys belonging to the right-hand set be depressed and at the same time another key or combination of keys belonging to the left-hand set or group be depressed the character corresponding to the key or keys of the right-hand set depressed will be first printed and instantly thereafter the character corresponding to the key or keys depressed of the left-hand set will be printed. A simple means by which I do this is illustrated in Fig. 4, the arrangement of the electric circuits being as illustrated in Fig. 1.

22 and 23 are parallel levers of equal length centered upon fulcrum-pins 24 24, set in the standard 2.

25 and 26 are parts of the connection-changing device, shaped as illustrated in Fig. 4 and pin-jointed to the opposite ends of the parallel levers 22 and 23. The part 25 overlies all the contact-springs 3 3, &c., belonging to the right-hand keys, and to the frames $D^6$ and $E^7$ belonging to the right-hand keys, and the corresponding part 26 overlies all the contact-springs 3 3, &c., belonging to the left-hand keys and to the left-hand frames $D^6$ and $E^7$.

27 is a contractile spring tending to hold the parts 22, 23, 25, and 26 in their normal positions, the lever 22 resting against an adjustable stop 28.

32 is an electromagnet supported by a bracket 33, screwed fast to the standard 2. The armature of the magnet 32 is marked 34. It is a lever of considerable mass, centered at 35. A contractile spring 36 holds the armature-lever 34 normally in contact with an adjustable stop 37. The magnet 32, when energized by the passage of an electric current through its coils, serves to attract its armature 34, which when moving toward the magnet strikes the pin 38, projecting from the part 25, thus lowering said part 25, which overlies the right-hand keys, and raising the corresponding part 26, which overlies the left-hand keys.

42 is a holding or clutch magnet having an armature 43. The clutch-magnet 42 is supported by a bracket 44, screwed fast to the standard 2, and its armature 43, which is centered at 45, serves when the magnet 42 is energized to press against the proximate curved end of the lever 23 with force sufficient to hold the parts 22, 23, 25, and 26 in the positions into which they are moved by the action of the magnet 32 and armature 35 against the opposing tendency of the spring 27, &c. The arrangement of circuits it will be observed (see Fig. 1) is such that when any of the keys $D'$, $D^2$, $D^3$, $D^4$, $D^5$, $E'$, $E^2$, $E^3$, $E^4$, $E^5$, or $E^6$, either of the right-hand set or of the left-hand set, close circuit they close circuit through the clutch-magnet 42, while only the keys of the right-hand set close circuit through the magnet 32. In other words, the clutch-magnet 42 is between the battery B and the point where the wire B' branches to connect with the right-hand and left-hand sets of keys, while the magnet 32 is on the right-hand keys' side of the branching point of said wire. In Fig. 4 the parts 25 and 26 are shown standing in their middle positions. In their normal positions, in which they are held by the contractile spring 27, the part 25 lies such a distance above the contact-springs 3 3 3, &c., belonging to the right-hand keys and frames, that such springs when their keys are depressed (or when the frames $D^6$ and $D^7$ lie in their normal positions) make connection with the magnet-terminals $d'$, $d^2$, $d^3$, $d^4$, $d^5$, $d^6$, $e'$, $e^2$, $e^3$, $e^4$, $e^5$, $e^6$, and $e^7$, corresponding, respectively, with the keys $D'$ $D^2$ $D^3$ $D^4$ $D^5$, frame $D^6$, keys $E'$ $E^2$ $E^3$ $E^4$ $E^5$ $E^6$, and frame $E^7$, and the part 26 lies in such proximity to the contact-springs 3 3 3, &c., belonging to the left-hand keys and to the left-hand frames, that such contact-springs 3 3 when their keys are depressed (or when the frames $D^6$ and $E^7$ are in their normal positions) come in contact with and are arrested by the lower surface of the part 26, so that though the parts $D'$, $D^2$, $D^3$, $D^4$, $D^5$, $D^6$, $E'$, $E^2$, $E^3$, $E^4$, $E^5$, $E^6$, and $E^7$, or some of them, are in position to make connection with the corresponding magnet-terminals $d'$, $d^2$, $d^3$, $d^4$, $d^5$, $d^6$, $e'$, $e^2$, $e^3$, $e^4$, $e^5$, or $e^7$ they cannot do it. The consequence of this arrangement is that on depressing at the same time a key or keys of the right-hand set and a key or keys of the left-hand set, the key or keys depressed of the right-hand set close circuit with the corresponding one of the magnets $b$ $b$, so that the required letter or other character, corresponding to the key or keys depressed of the right-hand set, is printed; but the left-hand keys, when first depressed, are prevented from closing circuit by the part 26 acting as an obstruction to the contact-springs 3 3 3, &c., belonging to the left-hand keys and frames, preventing them from making connection with the corresponding magnet-terminals $d'$ $d^2$, &c., $e'$ $e^2$, &c., as the case may be. Closing circuit, however, through any of the right-hand keys energizes the magnet 32 so that it attracts its armature 34, which in due time strikes the pin 38 and rocks the levers 22 and 23, so that the part 25 moves down, depressing any of the contact-springs 3 3 belonging to the right-hand keys and frames, which may be raised so that such contact-springs can no longer close circuit with the corresponding magnet-terminals $d'$ $d^2$, &c., $e'$ $e^2$, &c., of the right-hand set, thus breaking the circuit of the right-hand-controlled magnet, and raising, at the same time, the part 26, so that the contact-springs 3 3 of the left-hand set, belonging to the keys depressed, close circuit with the corresponding contact-pieces $d'$ $d^2$, &c., or $e'$ $e^2$, &c., as the case may be, thus energizing that one of the set of magnets $b$ $b$ $b$ which corresponds to the key or combination of keys of the left-hand set depressed and printing the letter controlled by such magnet. When the keys return to their normal positions, the circuit is broken, the clutch-magnet 42 loses its magnetism, and the armature 43 no longer acting as a clutch or brake upon the part 23, the spring 27 returns the parts 22, 23, 25, and 26 to their normal positions before described. The power of the magnet 32, the weight of its armature 35, and the distance through which such armature moves should all, in order to obtain the best effect, be adjusted in such a manner that the armature will act upon the pin 38, and through that upon the parts 22, 23, 25, and 26, so that it breaks the circuit of the magnet $b$, controlled by the right-hand key or keys depressed, at or a little before the type controlled by such magnet makes its imprint, so that the right-hand-controlled type-lever rebounds instantly and leaves room for the left-hand-controlled type-lever to move up and print its character, and to secure the best results the space-magnet $H^{51}$ should be made very quick-acting, so that in the short interval of time between the breaking of the right-hand-controlled circuit and the closing of the left-hand-controlled circuit (an interval which may be made of greater or less duration, as required, by adjusting the play of the parts 25 and 26) the space-magnet can act, and the clutch or detent magnet 32 should be made somewhat more sluggish in its action, so that in the short interval of time before mentioned between the breaking of the right-hand-controlled circuit and the closing of the left-hand-controlled circuit it will not allow the parts 25 and 26 to return to their normal positions under the action of the spring 27. This adjustment must be carefully attended to in order to obtain the best results.

I have said that the frames $D^6$ and $E^7$, when in their normal positions, make connection with the corresponding magnet-terminals $d^6$ and $e^7$. This, however, is to be understood subject to the qualification that such frames do thus make connection, except when prevented by the action of the parts 25 and 26 pressing upon their contact-springs 3 3. Strictly speaking, the frames $D^6$ and $E^7$ of the right-hand set, when in their normal positions, (like the keys of the right-hand set when first depressed,) do make connection with the corresponding magnet-terminals, and the frames $D^6$ and $E^7$ of the left-hand set of keys, when in their normal positions, are prevented from making connection by the position of the part 26, which prevents their contact-springs 3 3 from touching the corresponding magnet-terminals $d^6$ and $e^7$; but when the magnet 32 is energized, and the parts 22, 23, 25, and 26 moved from their normal positions, as before described, then the frames $D^6$ and $E^7$, belonging to the right-hand set of keys, no longer make connection, and the frames $D^6$ and $E^7$, belonging to the left-hand set of keys, if such frames are in their normal positions, do make connection with the corresponding contact-pieces $d^6$ and $e^7$.

It remains to describe the spacing mechanism. The spacing mechanism which I prefer to employ is mechanically modeled, in many particulars, on that illustrated in Letters Patent of the United States No. 502,700, granted to me on August 8, 1893, to which Letters Patent reference is hereby had and made for a description of such spacing mechanism. (See particularly Figs. 13 and $13^a$ of the drawings attached to said patent and pages 8 and 9 of the specification thereof.) But while the present spacing mechanism is modeled to a great extent in mechanical points on that illustrated in the patent before mentioned it differs therefrom in being electrically operated and controlled; and in these respects it is modeled in many particulars on the spacing mechanism illustrated in a previous application of mine, Serial No. 572,121, filed December 14, 1895.

$c^{87}$ is the space-rack, Fig. 5, attached to the carriage, so that it moves with it.

H is the dog-carrying lever, made in two parts adjustable with relation to each other, so as to bring the loose dog and the fast dog nearer together or farther apart, as required.

$H^3$ is the fast dog, and $H^4$ the loose dog.

$H^5$ is a bridle-lever, connected with the fast dog and carrying an adjustable stop $H^{33}$.

$H^{62}$ is another lever, carrying another adjustable stop $H^{34}$. Flanges $H^{41}$ $H^{41}$, &c., screwed fast to the downward extension of the top plate $A^{41}$, serve to fulcrum the various levers above mentioned. The armature-levers hereinafter described, &c., $H^{42}$ $H^{42}$ are adjustable stops serving to limit the play of these levers.

$H^{80}$ is a lever connected by a link $H^{81}$ with the dog-carrying lever, and carrying a stop $H^{82}$, against which the loose dog $H^4$ rests when all the parts occupy their normal positions. The other mechanical parts will require no description.

$H^{51}$ is the principal spacing-magnet. It is in circuit with the battery B, (see Fig. 1,) so that when the circuit of the battery is closed, whether by the right-hand keys or by the left-hand keys, the current flows through the coils of the magnet $H^{51}$. $H^{52}$ is the armature of said magnet. When the current flows through the magnet $H^{51}$, it attracts the armature $H^{52}$, which thereupon tilts the dog-carrying lever H, raising the fast dog $H^3$ up into the teeth of the rack $c^{87}$ and withdrawing the loose dog $H^4$ from engagement with the rack, so that the loose dog, when released from the rack, moves under the influence of its contractile spring $H^{36}$ until it is arrested by the stop $H^{34}$, attached to the lever $H^{62}$. The parts are all adjusted in such a manner that this movement of the loose dog is just sufficient to allow of the carriage making one letter-space; and when the current is cut off from the magnet $H^{51}$ by the releasing of the keys, the armature $H^{52}$ returns to its normal position, the fast dog is withdrawn from engagement with the rack $c^{37}$, the loose dog is again brought into engagement with it, and the carriage, no longer held back by the fast dog, moves on until it is arrested by the loose dog coming in contact with the stop $H^{32}$, so making a single letter-space. This operation takes place with every letter that is printed. At the end of a word, or, rather, between words, (for the space might be made at the beginning of a word as well as at the end,) it becomes necessary to make a larger space. To this end, the keyboard is furnished with a space-key G. This key is connected with one pole of an auxiliary battery $B^3$ by a wire $B^4$. It is insulated from the metal strip $f^5$ and arranged so that it does not touch the frame $E^7$, and serves, when acted upon by the operator, to make connection with the wire $g$, which is connected through the coils of the auxiliary space-magnet 51 and the space-enlarging magnet $H^{61}$ with the other pole of said auxiliary battery B. The key G is to be acted on by the operator simultaneously with the key or keys which make the last letter of a word, and, when acted on, it closes circuit through the space-enlarging magnet $H^{61}$ and the auxiliary space-magnet 51. The action of the auxiliary space-magnet 51 upon the armature $H^{52}$ and related parts is exactly the same as the action of the principal space-magnet $H^{51}$ before described. The space-enlarging magnet $H^{61}$, when energized, attracts its armature $H^{62}$, which carries the stop $H^{34}$ down out of the way of the loose dog, so that the loose dog, when freed from the rack $c^{37}$, is now moved by its spring $H^{36}$ until it is arrested by the stop $H^{33}$, which stop is so set that the enlarged movement which it permits to the loose dog is sufficient to permit a movement of the carriage of two letter-spaces, when the various parts return to their normal positions. In a word, the space-magnets $H^{51}$ or 51, either or both, with the armature $H^{52}$, operate in the ordinary manner to actuate the spacing-dogs; and the space-enlarging magnet $H^{61}$, with its armature $H^{62}$, operates to enlarge the space by increasing the free movement of the loose dog.

$H^{37}$ and $H^{38}$ are contractile returning-springs, serving to return the dog-carrying levers and the armatures to their normal positions.

$m$ is the paper-roll or platen; $m'$, the frame of the paper-carriage; $m^2$, the back rod on which the carriage runs, and $m^3$ the frame hinged to the carriage-frame and to which the space-rack $c^{37}$ is attached.

In respect to the arrangement of the type-levers, carrying each an upper-case and a lower-case character; the paper-carriage; the arrangement of a shift (not shown in the drawings, being universally understood in the art) whereby the platen or paper-roll is moved from its lower-case to its upper-case position, or vice versa; the interlinear-spacing mechanism, and the ribbon mechanism, controlled by the movement of the carriage, the machine illustrated in the drawings is intended to follow the details of construction well known to the public in the old "Remington No. 2" machine, which many years of experience have wrought out and which long practice has approved; but none of these details form any part of my invention, and any suitable plan or construction whatever may be followed for them.

Having now fully described that device which I consider as on the whole best for carrying out my invention, I shall proceed to call attention, briefly, to certain modified devices that may be used in carrying out important portions of my invention.

In the preferred device hereinbefore fully described a small number of keys is made to serve for a large number of characters. The advantage of such an arrangement is that with a small number of keys only to operate, instead of a large number, the operator can write more rapidly and is, moreover, free to look continuously at his copy, instead of being obliged, as in the machines now in common use, to look part of the time at the copy and part of the time at the keys. The constant labor of the eyes also in looking at the keys, and the severe taxing of the muscles of accommodation which results from changing the point of vision several times a second, as keys in different parts of the keyboard are looked for and depressed, are entirely avoided. The arrangement of a few keys, therefore, serving for many characters is the one which I prefer; but my invention may be used with a separate key for each character or for each type-lever, if desired, and in such case the arrangement of the keys and electric circuits may be, for example, as illustrated in Fig. 9. There are in this figure, it will be observed, two keyboards or sets of keys, one of which keyboards is furnished with a full set of keys, answering, we may suppose, to the thirty-eight type-bars of the well-known Remington No. 2 machine, and each of these keys, it will be seen, corresponds to one of the thirty-eight type-lever-controlling electromagnets $b$ $b$. (Seen in the upper part of the figure.) The other keyboard is made, preferably, with a smaller number of keys, answering to the major part of the letters of the alphabet, though it might obviously, so far as the principle is concerned, be furnished with as many keys as the right-hand keyboard. The keys of the right-hand keyboard are marked 61 61, &c., and those of the left-hand keyboard are marked 62 62, &c.

The keys of both keyboards are connected with one pole of the battery B, as illustrated in Fig. 9, by wires 77 and 83, respectively, the connection being made through the principal space-magnet $H^{51}$ and the clutch-magnet 42, so that when the circuit of the battery is closed, either by right-hand keys or by left-hand keys, the current passes through said magnets, and the connection from the battery B to the right-hand keys 61 61 is made also through the connection-changing magnet 32, while the connection from the battery B to the left-hand keys 62 62 is made through an inductionless resistance $r$, having the same ohmage as the magnet 32, all as illustrated in the drawings and hereinbefore fully described in connection with the preferred form of device. The fulcrums of the keys 61 and 62 and the usual marked finger-pieces attached to the keys and upon which the operator strikes are in front of the break-line of the drawing, and so do not appear in the drawings. The operator acting upon the front end of a key (broken away in Fig. 9) causes the part of the key which appears in the drawing to rise. Each key, when thus depressed in front and elevated behind, comes in contact with a wire 63, forming one terminal of the corresponding electromagnet $b$, and closes circuit through such magnet and the common return-wire 64. With this common return-wire 64, it is to be observed, every one of the magnets $b\ b\ b$, Fig. 9, has one terminal connected, the other terminal of every such magnet being in make-and-break relation with the corresponding key or keys. With the arrangement illustrated in Fig. 9, having a key for every type-lever, the arrangement of parts 22 23 25 26 34 38 42 43, &c., (illustrated in Fig. 4,) may be used to break the circuit of the right-hand key depressed and to close the circuit of the left-hand key depressed at or about the instant the letter corresponding to the right-hand key depressed is printed, in which case every one of the keys 61 61, &c., 62 62, &c., should be furnished with an attached contact-spring 3, after the fashion illustrated in Fig. 3 and before fully described; or a somewhat simpler device may be used, as illustrated in Fig. 10, serving to break the battery connection with the right-hand keys and to establish the battery connection with the left-hand keys in such a length of time after the simultaneous depressing of a right-hand key and a left-hand key as is necessary for the printing of the letter corresponding to the right-hand key depressed.

In Fig. 10, 32 is the connection-changing magnet, and 34 is its armature. 42 is the clutch-magnet, and 43 its armature. 71 is the connection-changing lever, centered at 72. One end of said lever 71 lies in the path of motion of the armature 34, so that the armature 34, when attracted by its magnet 32, strikes the connection-changing lever 71 and moves it from its normal position. The connection-changing lever 71 carries a contact-spring 73, and a contractile spring 74 holds the lever 71 normally in such a position that the attached contact-spring 73 makes connection with the adjustable screw 75. A wire 76 leads from this screw to the connection-changing magnet 32, and another wire 77 leads from said magnet to the right-hand key. The connection-changing lever 71 is connected through the coils of the principal space-magnet $H^{51}$ (represented diagrammatically only in Figs. 9 and 10) and clutch-magnet 42 with the battery B, and through this with the common return-wire 64, with which wire, as before explained, one terminal of each of the magnets $b\ b$ in Fig. 9 is connected. The armature 43 of the clutch-magnet 42 bears against the curved end of the connection-changing lever 71. Just below the connection-changing lever 71 is a contact-spring 81, screwed to the bracket 82, and having connected with it a wire 83, which is connected with the left-hand keys 62 62. The right-hand keys and left-hand keys make connection with the various magnets $b\ b$, &c., as illustrated in Fig. 9. Suppose now that a right-hand key 61 and a left-hand key 62, Fig. 9, are depressed simultaneously. It will be seen that the circuit will first be closed from the battery B, Fig. 10, through the clutch-magnet 42, the principal space-magnet $H^{51}$, the connection-changing lever 71, the attached contact-spring 73, the adjustable screw 75, the wire 76, the connection-changing magnet 32, the wire 77, leading to the right-hand keys, the right-hand key depressed, the particular magnet $b$ corresponding thereto, the common return-wire 64, with which the various magnets $b\ b$ are all connected in parallel, back to the battery B. The circuit being thus closed through the particular one of the magnets $b\ b$ corresponding to the right-hand key depressed, such magnet becomes energized and prints the corresponding letter. At the same instant, however, the connection-changing magnet 32, Fig. 10, being in like manner energized, attracts its armature 34, so that said armature strikes the connection-changing lever 71, moving it from its normal position and breaking the connection between the contact-spring 73 and the adjustable stop 75, and right-hand keys, and establishing connection between the lever 71 and the contact-spring 81, connected with the left-hand keys, so that the circuit is now closed from the battery B, through the clutch-magnet 42, the principal space-magnet $H^{51}$, the connection-changing lever 71, the contact-spring 81, bracket 82, the wire 83, leading to the left-hand keys, the left-hand key depressed, the particular one of the magnets $b\ b$ corresponding thereto, and the common return-wire 64, back to the battery B. Thus the magnet corresponding to the left-hand key depressed, being in its turn thrown into circuit, becomes energized and prints its letter. When the keys are released by the operator and the circuits in consequence broken, the clutch-magnet 42 loses its power and the connection-changing lever 71 returns to its normal position.

In the circuit-controlling devices hereinbefore described the mechanical movement which effects the change of energy from the right-hand keys to the left-hand keys is made electrically by the action of the magnet 32 upon the other parts of the device. I consider it most advantageous to make the change electrically, but it is not indispensable to my invention that it be so made. The mechanical movement necessary to effect the change from the right-hand keys to the left-hand keys may be made in various ways. It may be made, for example, directly by the keys themselves. One arrangement of this sort is illustrated in Figs. 11 and 12, in which a frame having a center rod 86 and a bent side and end piece 87 overlies the keys, so that it is raised when any key is acted on by the operator. An arm 88, attached to this frame, projects back under the part 26, before described, which overlies the left-hand keys. A weight 89 serves to give the necessary momentum to the whole, and a light spring (not shown in the drawings) presses the part 87 normally down upon the keys. Said part 87 has its surface proximate to the keys covered with insulating material. (Not shown in the drawings.) The operation is as follows: The keys, when depressed, raise the part 87 and the end of the part 88, which projects, as before said, in under the part 26. When the key makes connection with the corresponding contact-piece (or comes into position to make connection) and comes to rest, the parts 87, 88, and 89 move on, under the influence of their acquired momentum, until after a brief interval of time the part 88 comes in contact with the part 26, before described, and raises it, rocking the levers 22 and 23 and depressing the part 25, before described, in the same manner and with the like effect as when such parts are moved by the action of the armature 34, Fig. 4, before described. With this device, it will be seen, the keys, when depressed, set the parts 87, 88, and 89 in motion, and make their connections (or, in the case of the left-hand keys, come into position to make their connections) before the parts 87, 88, and 89 have moved far enough to act upon the part 26. The keys simply set the parts 87, 88, and 89 in motion, and these parts have then to move on, (after the right-hand keys have made their connections,) under the influence of their acquired momentum, such a distance before they act upon the parts 26 and 25 that there is time for the right-hand-controlled magnet to print its letter before the connections are changed and the left-hand-controlled magnet brought into action. This device, however, is inferior to the electromagnetic circuit-controlling devices before described in that it requires either (a) a very uniform touch or (b) a longer interval of time between the breaking of the right-hand-controlled circuit and the closing of the left-hand-controlled circuit, but by using a uniform touch or by allowing a sufficient interval of time between the breaking of the right-hand-controlled circuit and the closing of the left-hand-controlled circuit to compensate for inequalities in the touch it can be made to operate well.

The various forms of device before described for carrying out my invention require a multiplicity of magnets, and such forms I consider to be on the whole most convenient; but important parts of my invention, I wish it to be understood, may be carried out by a few magnets or even without any magnets at all.

Figs. 13, 14, and 15 illustrate diagrammatically a form of device in which two magnets only are used, one for the right-hand keys and one for the left-hand keys. 90 90 are levers centered between bars 91 91. The levers 90 90 answer to the key-levers of a Remington No. 2 type-writer and are connected by links or pull-down wires 92 92 with the type-bars a a, and are normally spring-pressed up against a felted stop-bar 93 by springs. (Not shown in the drawings.) Transverse to the type-bar-connected levers 90 90 are two sets of key-levers 94 94, fulcrumed between bars 95 95 and two sets of power-transmitting levers 96 96. The power-transmitting levers 96 96 are fulcrumed between bars 97 97, and each of said levers corresponds with some one of the keys either of the right-hand or of the left-hand sets and with one of the type-bar-connected levers 90, and serves, when connected by its key with the power mechanism hereinafter described, to move the type-bar-connected lever 90 with which it corresponds; and to this end each of the power-transmitting levers 96 96 is furnished with a downward-extending part 98, arranged in such a manner that when the lever 96 is depressed the part 98 engages with that one of the type-bar-connected levers 90 (and with that one only) with which the power-transmitting lever corresponds. It is to be understood that there is a right-hand key 94 and a left-hand key 94 for each of the type-bar-connected levers 90, and a power-transmitting lever 96 intermediate each key-lever and the corresponding type-bar-connected lever. Above the set of power-transmitting levers 96 96, (see Fig. 15,) corresponding to the right-hand keys, is a presser-piece 100, and above the set of power-transmitting levers 96 96, corresponding to the left-hand keys, is a similar presser-piece 101. Each of these presser-pieces is mounted by means of parallel guide-levers 102 102, pin-jointed to it and set upon center pins 103 103, and each of them carries a soft-iron armature 104. Magnets marked, respectively, 105 and 106, acting on the armatures 104 104, serve in the manner hereinafter described to operate the right-hand presser-piece 100 and the left-hand presser-piece 101. Said magnets are attached fast to brackets 107 107. The way in which these magnets are controlled will be described hereinafter. A tilting piece 110 (see particularly Fig. 14) is attached to each power-transmitting lever 96 96, and said tilting piece is connected with the corresponding key 94 by means of a bell-crank lever 111 and two links 112 and 113, the first of which is flexible and connects the key 94 with the bell-crank lever 111, and the second of which connects said bell-crank lever with the tilting piece 110. Each tilting piece 110 lies normally in such a position that the corresponding presser-piece 100 or 101 can descend (under the influence of the corresponding magnet 105 or 106) without catching the tilting piece; but the key serves, when depressed, to rock the bell-crank lever 111, so that the upper end of the tilting piece 110 is thrust in under the corresponding presser-piece 100 or 101 in such a position that the presser-piece overlying it cannot descend without catching and depressing it and the power-transmitting lever 96 connected with it; and the power-transmitting lever, when thus depressed, acts through the attached projection 98 upon the corresponding type-bar-connected lever 90, depressing such last-named lever and throwing up the type against the paper-roll m. The clutch-magnet 42, with its armature 43, the space-magnet H⁵¹, (illustrated diagrammatically only in Fig. 15,) and the connection-changing lever 71 with its accessory parts, are the same as already fully described in connection with Fig. 10, &c.

Having thus described the essential parts of the mechanism of the modification illustrated in Figs. 13, 14, and 15, it will now be proper to describe the electrical connections and the mode of operation. (See particularly Fig. 15.) Underneath the keys 94 94 of both sets is a rocking frame 114, having a center rod 115. This frame is arranged in such a manner that any of the keys 94 94, when depressed, press upon the frame and move it down. The frame carries a platinum point 116, which serves to make connection, when a key is depressed, with a contact-spring 117, connected with the battery B. The effect of this is to close circuit from the battery B through the clutch-magnet 42, principal spacing-magnet H⁵¹, connection-changing lever 71, attached contact-spring 73, adjustable contact-screw 75, wire 118, electromagnet 105, controlling the right-hand presser-piece and serving as a power device for the right-hand-operated keys, wire 119, frame 114, attached platinum point 116, and contact-spring 117, and thence back to the battery B. The magnet 105 becoming energized by the passage of the current attracts its armature 104, so pulling down the guide-levers 102 and the right-hand presser-piece 100. The part last named comes in contact with the tilting piece 110, connected with the right-hand key depressed, and presses it down, thus pressing down the power-transmitting lever 96 and the type-bar-connected lever 90, corresponding to the right-hand key depressed, which throws the type-lever a, corresponding to the right-hand key depressed, up against the paper-roll m, so that the letter corresponding to the right-hand key depressed is printed. When the presser-piece 100 descends, a pin 120, set fast in it and projecting from it, comes in contact with the connection-changing lever 71 and moves it from its normal position, breaking the circuit of the magnet 105 and closing the circuit of the magnet 106. The magnet 105 looses its magnetism and the armature 104 and presser-piece 100 return to their normal positions and permit the right-hand-controlled type-lever a and right-hand-controlled type-lever-connected lever 90, with the corresponding power-transmitting lever 96, to return to their normal positions. The connection-changing lever 71 being thus moved from its normal position by the action of the pin 120, attached to the presser-piece 100, the circuit is closed from the battery B through the clutch-magnet 42, spacing-magnet H⁵¹, connection-changing lever 71, contact-spring 81, magnet 106, (which controls the left-hand presser-piece 101,) wire 119, frame 114, attached contact-point 116, and contact-spring 117 back to the battery B. The circuit being thus closed through the magnet 106, said magnet becomes energized and attracts its armature 104, thus pulling down the left-hand presser-piece 101, which comes in contact with the tilting piece 110, operated by the left-hand key depressed, pressing down said tilting piece and with it the power-transmitting lever 96 and type-bar-connected lever 90, corresponding to it, thus throwing up the type-lever corresponding with the left-hand key depressed and printing the left-hand-designated letter. When the keys are released, the frame 114 rises, thus breaking the connection between the contact-point 116 and contact-spring 117, so that the magnet 106 looses its magnetism and all the parts return to their normal positions.

Instead of employing an electrical device to change connections, obviously a mechanical device for that purpose, such substantially as that hereinbefore described in connection with Figs. 11 and 12, might be used in its stead.

In all the various forms of device hereinbefore described for carrying out my invention electromagnets are employed. I consider electromagnets as the most suitable mechanism for the purpose; but I wish it to be understood that certain very important parts of my invention may be carried out without electromagnets. It will be obvious upon consideration that some other form of power device might be used instead of electromagnets. This will be more especially obvious in connection with a device which, like that illustrated in Figs. 13, 14, and 15, has two presser-pieces or strikers serving one to make the right-hand-selected letter and the other to make the left-hand-selected letter, and, indeed, the most essential part of my invention, to wit, the making of two letters in rapid succession from keys depressed simultaneously, may be carried out without any sort of power device. The essential point is a suitable quick-acting connection between one set of keys and the type-bars, or other similar mechanism and a relatively slow-acting connection between the other set of keys and the type-bars or equivalents, so that, the keys being depressed simultaneously, the letters are produced in rapid succession. Power connections are best, but mechanical connections not being power connections may be used instead. A simple device of this sort is illustrated in Fig. 16, which is a view corresponding with Fig. 15, illustrating a device which is a modification of that illustrated in Figs. 13, 14, and 15, differing from the device illustrated in Figs. 13, 14, and 15 in using the power applied by the operator to the keys for printing instead of the power of the electromagnets. The magnets and electrical connections are omitted. The presser-pieces 100 and 101 are made quite heavy, so that they are in effect momentum-pieces, and they are counterbalanced by springs (not shown) of unequal strength. In place of the single frame 114, extending under both sets of keys, two similar but smaller frames 114 114 are employed, the first of which lies underneath the right-hand keys, so as to be depressed by them, and the second of which lies underneath the left-hand keys, so as to be depressed by them. A cord 122 connects the right-hand frame 114 with a lever 123, which acts through a jack 124 upon the presser-piece 100, and a similar cord 122 connects the left-hand frame 114 with a similar lever 123, which acts through a similar jack 124 upon the left-hand presser-piece 101. The spring connected with the right-hand presser-piece 100 is much stronger than the similar spring connected with the left-hand presser-piece 101, and the left-hand presser-piece lies much closer to the tilting pieces 110, which it operates, than the left-hand presser-piece 101 does to the tilting pieces which it operates. The whole arrangement is such that the right-hand frame 114, connections intermediate it and the presser-piece 100, and said presser-piece 100, with the parts intermediate it and the type-bars, constitute a quick-acting connection between the right-hand keys 94 and the type-levers a a, while the left-hand frame 114, connections intermediate it and the presser-piece 101, with the parts intermediate said presser-piece and the type-bars a a, constitute a slow-acting connection between the left-hand keys and the type-bars. Thus when a key of the right-hand set and a key of the left-hand set are depressed simultaneously they depress the frames 114 and 114, which, through their respective cords 122, levers 123, and jacks 124, act upon the corresponding presser-pieces 100 and 101, moving them down a convenient distance, when the horizontal arms of the jacks 124 come in contact with the adjustable jack-stops 125, so that the lower end of the vertical arm of the jack moves off of the presser-piece, leaving it free to return to its normal position. The presser-pieces, however, move on, under their acquired momentum, and the right-hand presser-piece 100 instantly comes in contact with the tilting piece 110, thrust in under it by the right-hand key depressed, and depresses said tilting piece, and with said tilting piece the power-transmitting lever 96, connected therewith, moving the type-bar-connected lever 90 and throwing the type-lever a, connected therewith, up against the paper carried by the paper roll m, and upon the rebound of said right-hand-controlled type-bar the presser-piece 100 returns to its normal position. About the time that the right-hand-controlled type-lever retreats from the paper, after delivering its blow, the left-hand presser-piece 101 comes in contact with the tilting piece 110, thrust in under it by the left-hand key depressed, and through such tilting piece and the power-transmitting lever 96, connected therewith, acts upon the type-bar-connected lever 90, so that the letter corresponding to the left-hand key depressed is printed. The whole arrangement, it will be seen, is such that the connections between the right-hand keys depressed and the printing-characters are quick-acting, while the connections between the left-hand keys and the printing-characters are, relatively speaking, slow acting, so that keys of the right-hand and left-hand sets depressed simultaneously print in rapid succession. The lower faces of the presser-pieces 100 and 101 should of course be faced with rubber or other suitable elastic material I have described, it will be observed, two several different ways in which the change from the right-hand keys to the left-hand keys may be made, so that by simultaneous actions of the operator consecutive letters are made in rapid succession, and that from a single set of printing-characters. I wish it to be understood, however, that it may be made in still other ways, several of which I have devised; but having described the best I shall not burden this specification with any further description in this regard of alternative constructions.

In the preferred form of device (illustrated in Figs. 1, 2, 3, and 4, and also in the modification illustrated in Fig. 9) a single set of magnets serves for both sets of keys. So far as the essential point of my invention, however, is concerned, to wit, the making of consecutive letters in rapid succession by depressing the different keys simultaneously, two sets of electromagnets may be used, one serving for the right-hand keys and the other serving for the left-hand keys, the connections being shifted in a suitable manner, as already described, from one set to the other. Fig. 17, which is a diagrammatic view similar to Fig. 1, illustrates such an arrangement, in which each set of keys has a set of magnets of its own which it controls. 130 130, &c., are the magnets or coils connected with the right-hand set of keys, and 131 131 are the magnets or coils connected with the left-hand set of keys. The arrangement of parts serving as the circuit-changing device illustrated diagrammatically in Fig. 17 is substantially the same as that illustrated in Fig. 10, and already fully described. In general, however, so far as I am now aware, the arrangement of a single set of magnets, as in the preferred device, serving for both sets of keys, will answer for general use, and it has the merits of simplicity and cheapness, making a single set of magnets and a single set of ultimate letter-controlling parts serve for the two sets of simultaneously-operated keys, which are matters of great consequence in a type-writing machine, and of some consequence, but of much less, in a type-setting machine or linotype-machine, to which, as well as to type-writing machines, my invention, it will be remembered, is applicable; but in one important particular two sets of magnets, or what is equivalent thereto, one set serving for the right-hand keys and the other set serving for the left-hand keys, has advantages. A peculiar arrangement for this purpose is illustrated in Figs. 17 and 18, taken together. The right-hand set of keys has its own set of magnet-coils 130 130, and the left-hand set of keys has its own set of magnet-coils 131 131. The right-hand-controlled coils 130 surround the soft-iron cylinders $b'$ $b'$ and the left-hand-controlled coils 131 131 surround the soft-iron cylinders $b^2$ $b^2$. The currents circulate in the coils 130 in one direction and in the coils 131 in the opposite direction. This arrangement tends somewhat to facilitate rapid making of the letters. The most difficult point, in this connection, with the preferred device, is the making of the double letters, as "ee," "ll," "mm," "nn," "oo," &c., which are made by successive motions of the same type-bar, so that the type-bar has not time to make its full rebound from the first blow before it is necessary for it to make the second. Anything that facilitates the loss of magnetism on the breaking of the right-hand-controlled circuit favors rapidity of operation, and the arrangement of Fig. 18, by which the left-hand-controlled current circulates in the coil 131 in the opposite direction to that in which the right-hand-controlled current circulates in the coil 130, favors rapid demagnetization. The expense of a double set of coils, as 130 and 131, however, together with the increased size and weight of the cores $b'$ and $b^2$, as compared with the preferred device (see Fig. 3) and its single set of coils $b^3$ $b^3$, tends to countervail the advantages resulting from employing two sets of coils, 130 and 131, as in Fig. 18. The modification illustrated in Figs. 17 and 18 has one advantage, however, not before adverted to, to wit, the fact that it requires only the simple arrangement of circuit-changing parts illustrated diagrammatically in said Fig. 17, (and shown on a larger scale in Fig. 10,) instead of the more complex arrangement of parts required by the preferred form of device, with the arrangement of circuits of Fig. 1, (see Fig. 4;) but whatever the respective merits of the different forms of my invention illustrated ($a$) in Figs. 1 and 3 and ($b$) in Figs. 17 and 18 may be, other and advantageous uses, very likely, may be made of the form of my invention illustrated in Fig. 17, with a separate set of magnets for each set of keys, and a circuit-controlling arrangement whereby the two sets of magnets are made to act in rapid succession, and, at all events, Fig. 17 shows, and I wish it to be very clearly understood, that though I prefer to control the same printing-mechanism by the two sets of keys, producing the right-hand keys' action from such mechanism first, and the left-hand keys' action from the same mechanism or set of printing-characters immediately thereafter, the feature of my invention of quick-acting mechanism connected with one set of keys and slow-acting mechanism connected with the other set of keys may be used with entirely separate and distinct devices controlled by the two sets of keys, and while I consider it every way preferable to use a single set of type-bars or a single typeform in a type-writing machine, and a single set of matrix-pieces in a type-setting machine, or, more broadly, a single set of printing-characters, whatever these may be, and whatever the machine in which they may be used, and to operate upon this single set of printing-characters with both sets of keys, each set of keys selecting its own proper character from the one common set, I wish it to be very distinctly understood that I do not limit myself in the carrying out of the central idea of my invention of the combination, with printing-characters, of quick-acting and slow-acting selecting devices, or letter-controlling devices, operated simultaneously for the production of consecutive letters, one from each set, the letters being made in rapid succession, to an arrangement in which the same single set of printing-characters is controlled by the two sets of keys, for if I were thus to limit myself the most important feature of my invention, at all events as applied to typesetting and linotyping machines, of the successive selecting or producing of consecutive letters by the simultaneous depressing of different keys, could be readily evaded. In brief, the feature of making a single set of printing-characters, or a single printing mechanism, or a single set of power devices, or a single set of electromagnets, or a single set of ultimate letter-controlling parts or devices, serve for the two sets of simultaneously-operated keys, I consider one of great practical value and importance; but other features of my invention may be used, and particularly the important features of the quick-acting and slow-acting connections—however the fact may be expressed—between the different sets of keys and the parts ultimately controlled by them, whether the single set of printing-characters or the single set of power devices, serving alike for both sets of keys, be used or not.

In connection with the electrically-controlled circuit-changing device illustrated in the drawings, (see particularly Figs. 4, 10, and 15) the most important parts are the magnet controlled by the right-hand keys, (that is, arranged so that it is brought into action as a result of the depressing of the right-hand keys,) and the circuit-controllers controlled by such magnet. It is convenient, and in several ways advantageous, to arrange the parts in such a manner that the circuit-changing magnet acts through intermediate parts upon the part or parts which directly control the circuit; but very obviously the magnet might act directly upon such parts. Thus, for example, it will be obvious that the magnet 32 might be made to act directly in Fig. 4 upon any of the parts 22, 23, 25, or 26, and in Fig. 10 or Fig. 17 it might be made to act directly upon the circuit-changing lever 71. Such an arrangement, however, I consider less advantageous than that illustrated in the drawings.

The clutch-magnet 42 in Figs. 4, 10, and 17 may obviously be dispensed with by putting the connection-changing magnet 32 in circuit in the same way in which the magnet 42 is placed in circuit, so that whenever the circuit is closed either by the right-hand keys or by the left-hand keys the current will flow through the magnet 32. On the whole, however, I consider the arrangement illustrated in the drawings, in which the connection-changing magnet is in circuit only with the right-hand keys, and in which a clutch-magnet, as 42, is employed, and in which the connection-changing magnet's armature acts like a hammer upon the connection-changing parts, so that they are moved and the connections changed in a very small fraction of a second to be superior, for by this arrangement the magnet 32 is made slow-acting in the first instance, so that time is given to the right-hand-controlled letter-selecting mechanism to act, and, in the second place, the armature of the the magnet 32 has ample time, from the breaking of the right-hand-controlled circuit till the next depressing of the keys, to return to its normal position; but I wish it to be understood that the device may be varied in many ways without departing from certain of the more important features of my invention.

The form of permutational letter-selecting device illustrated in Fig. 1 is suitable for use in carrying out my invention; but I not attach any great importance to it. It is only one of several that may be used in carrying out my invention. Indeed my invention may be used with any suitable form of electrical selecting device whatever, and I do not restrict myself to the forms illustrated in the drawings.

In the drawings I show a single battery B, serving both for the right-hand-controlled circuits and for the left-hand-controlled circuits. This arrangement is most convenient; but it will be obvious that a separate battery might be used for the right-hand-controlled circuits and another for the left-hand-controlled circuits.

In the drawings I show the two sets of keys, which when depressed simultaneously print in rapid succession arranged in two groups, one in convenient position to be operated by the right hand and the other in convenient position to be operated by the left hand. I consider this arrangement, by which one set of keys is appropriated to one hand and the other set to the other hand, as by all means most convenient and advantageous; but I wish it to be understood that the important feature of my invention of two sets or groups of keys connected with printing-characters so that keys of the two sets depressed simultaneously make their letters in rapid succession is not limited to the arrangement of the two sets of keys in groups corresponding one to the right hand and the other to the left hand, for very obviously the two sets might be intermixed, so that neither set of keys would belong wholly to either hand alone.

In the descriptive part of this specification I frequently use the expressions "right-hand keys" and "left-hand keys," "right-hand-controlled circuits" and "left-hand-controlled circuits," and other similar expressions. I use these expressions as convenient terms of description and with reference rather to the preferred construction than to the dry principles of invention, (which latter are set forth in the statement of claim,) and I do not wish to be understood by using the expressions mentioned as meaning that the two sets of keys are necessarily arranged so that one is acted on by the right hand and the other by the left hand, or that the two groups of circuits are controlled, necessarily, one by the right hand and the other by the left hand, for while such an arrangement is the one which I consider most advantageous it is not indispensable to the carrying out of most important parts of my invention.

With the two sets of keys before mentioned arranged in such a manner that one serves for the right hand and the other for the left hand, I prefer to arrange the parts so that the right-hand-controlled keys will produce their letters first and the left-hand-controlled keys immediately thereafter; but very obviously (see Figs. 4, 10, 15, 16, and 17) the arrangement might be reversed, so that the left-hand-controlled keys would make their letters first and the right-hand-controlled keys would act immediately thereafter. It is not a matter of any great consequence whether the right-hand keys act first or the left-hand keys; but for various reasons it is to some extent more advantageous to assign the making of the first letter to the right hand.

In connection with the electrical-connection-changing device it is most convenient and advantageous to break the right-hand-controlled circuit about the instant the right-hand-designated letter is printed, and to close the left-hand-controlled circuit at about the instant that the right-hand-controlled circuit is broken; but neither of these features of construction or arrangement is indispensable to the carrying out of certain important features of my invention, even where electrical connections are employed intermediate the keys and the printing devices. As to the first point, to wit, the breaking of the right-hand-controlled circuit, so that the left-hand-controlled magnet can act if we were to use, as obviously we might, a jack-escapement device intermediate the magnets $b$ $b$ and the type-levers $a$ $a$ substantially similar to the arrangement of jack illustrated in Fig. 16, or to the escapements commonly used in pianoforte-actions intermediate the keys and hammers, or to the jacks used intermediate the keys and the type-bars in some of the earlier writing-machines, (see, for example, the patent to Francis, No. 18,504, of October 27, 1857, and the patent to Beach, No. 15,164, of June 24, 1856,) it will be obvious that the necessity for breaking the right-hand-controlled circuit in order that the right-hand-controlled type-bar might retreat from the printing-point and leave room for the left-hand-controlled type-bar to print would be entirely avoided. The arrangement shown in the drawings, however, of a circuit-changing device breaking the right-hand-controlled circuits at the proper instant is simpler and more convenient. It is, in fact, a single simple escapement serving for all the right-hand-controlled parts.

As to the second point above mentioned, it is not necessary that the closing of the left-hand-controlled circuits should depend upon or be in any way connected with the breaking of the right-hand-controlled circuits. The left-hand-controlled circuits may be closed at the same time as the right-hand-controlled circuits, and by throwing more inductance or electrical inertia into the left-hand circuits, (which could easily be done by placing a laminated soft-iron core inside the coiled resistance $r$, Figs. 1 and 9,) so that they will become slower acting, the left-hand-controlled magnet may easily be made to print its letter in due time after the right-hand-controlled magnet has printed its letter.

I have illustrated my invention in the drawings as applied to a type-writing machine of the type-lever variety, that being the sort which I consider best. I wish it to be understood, however, that the invention is applicable to every sort of type-writing machine whatever having keys. The arrangement of keys and electric circuits illustrated, for example, in Figs. 1, 2, and 3 constitute, it will be seen, an arrangement of selecting devices having the electromagnets $b$ $b$ as the parts which apply the power to the work to be done, and the various keys D' D², E' E², &c., of the right-hand and left-hand sets, with their connections, as the means by which the different magnets $b$ $b$ are selected, each as required. Now it is a fact well known and long recognized in the art that a suitable selecting device may be made to operate any set of keys, and so by operating the keys or equivalent parts to operate any sort of type-writing machine of the key variety, and it will be obvious upon a moment's reflection that with my invention the magnets $b$ $b$ may be made to work the key-levers or equivalent parts of any sort of type-writing machine whatever, whether of the type-bar class or of the type-form or key-wheel class instead of being connected to the type-levers $a$ $a$ $a$. This fact being obvious, and the applicability of suitable selecting devices such as mine to the working of the keys or equivalent parts of any sort of type-writing machine being known and recognized in the art, I have not thought it necessary to burden the drawings with illustrations of this obvious fact. The point to which I wish to call attention is that the principle of my invention, of depressing two keys simultaneously and printing first the letter selected by or belonging to one key and then the letter selected by or belonging to the other, is readily applicable to any sort of type-writing machine having keys, whether it be a type-lever machine or a type-form or key-wheel machine.

In most type-writing machines it is necessary to depress but one key in order to print a letter. In some other machines it is necessary frequently to depress a plurality of keys in order to print a character. The essential part of my present invention is applicable to either type. Indeed my invention may be applied to any type of writing-machine in the following manner: Take, for example, the form of my invention illustrated in Fig. 9. Furnish each keyboard with keys corresponding to the keys of the machine which it is desired to operate and connect the magnets $b$ $b$ with the keys or equivalent parts of the machine to be operated.

My invention may be applied, as before mentioned, to type-setting and linotype machines, as well as to type-writing machines. This may be done in a variety of ways. Thus, for example, instead of employing the various magnets $b$ $b$ $b$ 130 130 131 131, &c. (illustrated with the keys and connections diagrammatically in Figs. 1, 9, and 17) to operate type-levers or other parts of a writing-machine, they may be made, very obviously, to operate the keys of any sort of type-setting machine, matrix-making machine, or linotype machine, so that energizing the various magnets $b\ b$ will have the effect of depressing corresponding keys of the type-setting or linotype machine, or, applying my invention to a type-setting or linotype machine, the electro-magnets $b\ b$ may obviously be made to operate those ultimate letter-controlling parts which the keys of such machines operate, (such as the escapement devices of the well-known Mergenthaler linotype-machines, whereby the matrix-pieces which correspond, respectively, with the different letters and other characters are dropped upon the conveying-belt, each as required.) A person who has mastered the description of my invention to be found in this specification, and who is skilled in the art pertaining to type-setting and linotype machines, will be able to apply my present invention to such machines without further description. I desire full protection for all such uses and applications of my invention.

My invention, it will be obvious, may also be applied in connection with printing-telegraphs, and for all such uses I desire full protection.

A great many modifications may be made in the carrying out of my invention without departing from the essentials thereof, which are set out in the paragraphs of claim at the end hereof. I desire full protection, and I wish it to be very distinctly understood that certain of the parts or subcombinations of my invention may be used for a variety of purposes in type-writing, type-setting, and linotype machines separate from the other parts herein described. Indeed some of the subcombinations involved in my invention and set forth in the statement of claim at the end hereof are capable of a great variety of uses and applications. I wish full protection as well for such subcombinations or parts of my invention as for the whole.

Many of the combinations set forth in the statement of claim at the end hereof include as one element "suitable printing-characters," or some other term of equivalent import. Printing-characters, I need not say, are an old element in machines of the kind to which my invention is applicable, and many different arrangements of them are known in the art and in common use. In some type-writing machines the printing-characters are separate types mounted each on a bar of its own. In other type-writing machines two or more printing-characters are mounted on a single bar and a multiplicity of bars are employed, with means for determining which of the characters on the bar shall be printed. In still other type-writing machines all the printing-characters are joined together or formed integral on a type-wheel, type-plate, or other suitable type-form. In some matrix-making machines the printing-characters used are like those of a type-writing machine, mounted sometimes on separate bars, sometimes gathered together into one battery or type-form. In other type-setting machines or linotyping-machines the printing-characters consist of or are formed upon separate bars, there being as many bars at least as there are letters in a line, each bar being provided with one or more alphabets of characters. In still other machines, such, for example, as that well known in the art and trade as the "Mergenthaler" linotype-machine, the printing-characters consist of separate matrix-pieces arranged in rows or groups, a row or group for each different character, each character-group containing a number of similar and separate matrix-pieces, which are dropped one by one, as required. Different sorts of machines, indeed, require different arrangements of the printing-characters. Without undertaking to give an exact definition of the term "printing-character," I wish it to be understood that that term, as I use it in this specification, is a term of broad import, including among other things (a) the separate characters of a bar type-writing machine, (b) the aggregated characters of a type-form or key-wheel machine, and (c) the various sorts of type and matrix pieces employed in type-setting machines, matrix-making machines, and linotyping-machines. The term "printing-characters" as applied to this art is indeed *nomen generalissimum*, and describes a whole group or family of different devices, all having a certain common resemblance, many of which are known in the art, none of which is new with me, and no particular one of which is essential or indispensable to the carrying out of my invention. Some arrangement of printing-characters must of course be used, for without printing-characters some way arranged no type-writing machine, type-setting machine, or other similar machine can exist; but any suitable arrangement whatever may be used, for important parts of my invention are applicable to machines of the class under consideration generally, as we have already seen, and in connection with a great variety of arrangements of printing-characters, if not with every sort of arrangement of printing-characters.

Some of the combinations set forth in the statement of claim at the end hereof include "letter-selecting mechanism" or "letter-selecting devices" as one of their elements. Letter-selecting mechanisms or devices are of many kinds. Indeed hundreds of them have been patented in type-writing machines, type-setting machines, linotyping-machines, and other similar instruments, and many different sorts are in common and public use in such instruments. Without attempting to give an exact definition of the term "letter-selecting mechanism," I wish to say that that term, as I understand it and use it in this specification, is a term of broad and general import, referring to the whole group or family of devices employed in type-writing machines, type-setting machines, and other similar instruments, whereby the different characters are selected, or taken, or brought into action, each as required. Some letter-selecting mechanisms include keys as an integral part. Other letter-selecting mechanisms have a single key, index-piece, handle, or pointer by the manipulation of which the different letters are brought into action, each as required. I have already described that peculiar form of letter-selecting mechanism which I prefer to employ; but it has also been made clear, and I wish it to be very distinctly understood, that much of my invention may be applied in connection with widely-differing forms of letter-selecting mechanisms, if not with any sort of letter-selecting mechanism, and that as to much of my invention I do not limit myself with regard to the peculiar sort of letter-selecting mechanism that may be employed. Many forms are known in the art, any suitable one of which may be used.

I prefer to use letter-selecting mechanisms having keys; but some important parts of my invention are capable of being used with selecting devices of the sorts which have no keys or which have but a single key, and I wish it to be understood that in those combinations hereinafter set forth in which selecting devices or selecting mechanisms are mentioned as an element of the combination, and keys are not mentioned as an element, I do not limit myself to selecting devices having keys.

Some of the combinations set forth in the statement of claim at the end hereof include "letter-controlling mechanism" as an element. "Letter-controlling mechanism," like "letter-selecting mechanism," is a term of broad and general import, referring to many different things well known in the art and having a common resemblance. It is, on the whole, a broader term than "letter-selecting mechanism" and includes in its meaning all sorts of letter-selecting mechanisms and all sorts of devices employed in bringing the printing-characters into position or action.

Very many different forms of letter-controlling mechanisms, as above mentioned, are known in the art. Several have been described in this specification. My invention is applicable alike to many such devices, and I wish it to be understood that when in the statement of claim I mention "letter-controlling mechanism" or "letter-controlling devices," without further limitations, I do not limit or restrict myself to any particular sort of letter-controlling mechanism or letter-controlling devices, but mean to include any suitable kind.

Some of the combinations set forth in the statement of claim at the end hereof include as an element "a single set of ultimate letter-controlling devices," or "a set of ultimate letter-controlling devices," or "a set of ultimate letter-controlling parts"—usually mentioned in connection with two sets of operating-keys and other enumerated parts. The ultimate letter-controlling devices used in different machines—type-writing machines of various kinds, type-setting, matrix-making, and linotyping machines of various sorts—are very different. I do not claim to have invented any new sort of "ultimate letter-controlling devices." The thing to which I refer by this term is something already known in the art and of which, as before said, there are very many different forms; and what I mean to point out by this term "a single set of ultimate letter-controlling devices" or "a single set of ultimate letter-controlling parts," used in connection with two sets of keys and other elements enumerated in the various claims in which this term occurs, is that peculiar feature of my invention by which the single set of ultimate letter-controlling devices—whatever these may be—belonging to the machine are made to serve in rapid succession for the making of consecutive letters by simultaneous actions of the operator. This I do by means of quick-acting and slow-acting connections between the different sets of keys and the single set of ultimate letter-controlling parts, the quick-acting connections serving to make or select their letter first from the single set of ultimate letter-controlling parts, and the slow-acting connections or devices serving immediately thereafter to make or select their letter from the same set of ultimate letter-controlling parts; but the feature of the quick-acting and slow-acting connections between the different sets of keys and printing characters, or between the different sets of keys and electromagnets, or between the different sets of keys and power devices, &c., is not necessarily limited, I wish it to be understood, to the feature of using quick-action and slow-acting selecting devices with one or a single set of ultimate letter-controlling parts; for this feature of quick-acting and slow-acting devices acted upon by the operator at the same instant and producing their characters in rapid succession is capable of use with separate sets of ultimate letter-controlling devices for the different sets of keys, as well as with a single set of ultimate letter-controlling devcies serving alike for both.

Several of the combinations set forth in the statement of claim at the end hereof include as an element "a permutational letter-selecting device." I do not claim in this application any new form of permutational letter-selecting device, considered by itself alone. I have already described that particular form of permutational letter-selecting device which I consider on the whole most convenient and which I prefer to employ, but to which I do not at all limit myself. Various other forms of permutational letter-selecting devices have been patented and are known in the art. Such devices are described, for example, in the patents to Munson, No. 246,411, dated August 30, 1881, and No. 352,143, dated November 9, 1886; in the patent to Beyerlen, No. 331,275, dated December 1, 1885; in the patents to me, before mentioned, No. 502,700, dated August 8, 1893, No. 531,904, dated January 1, 1895, and No. 541,222, dated June 18, 1895; in the patent to Cassagnes, No. 460,349, dated September 29, 1891; in the patents to Gause, No. 331,629, dated December 1, 1885, and Nos. 382,298, 386,776, 390,768, and 390,769, and in various other patents. The one feature which all permutational letter-selecting devices have in common is their capacity to produce different letters by different combinations or permutations of the keys or equivalent parts, so that a small number of keys is made to serve, by taking them in different combinations or permutations, for a larger number of characters. Permutational letter-selecting devices being things well known in the art, having the one feature above mentioned in common, and being otherwise infinitely diversified, I do not restrict myself, in the carrying out of my invention, to any particular sort, for my present invention, so far as permutational letter-selecting devices are concerned, does not consist in any new or peculiar form of permutational letter-selecting device, but in the combination of a suitable device of this sort with other elements, as enumerated in the statement of claim at the end hereof.

Several of the combinations set forth in the statement of claim at the end hereof include "power connections" as an element. These power connections are specified as being intermediate the keys and letter-controlling parts or intermediate the keys and the ultimate-letter-controlling parts. By "power connections" I mean parts which connect the keys with the letter-controlling parts and serve to apply power, other than that exerted by the operator upon the keys, to the letter-controlling parts. Various sorts of power connections are known. In the preferred device illustrated in Figs. 1, 2, 3, and 4 a multiplicity of electromagnets constitute the power connection. So in the devices of Figs. 9 and 17. In the form of device illustrated in Figs. 13, 14, and 15 the power connections consist of one magnet serving for the quick-acting keys and another magnet serving for the slow-acting keys; but electromagnets are only one form of power connection out of several known forms. An arrangement of cams is another form. Pneumatic power connections are used in organs for an analogous purpose, to wit, to connect the keys with the parts controlled by them, and in pianofortes and in type-setting machines of some sorts friction-driver power connections are used to connect the keys or equivalents with the parts controlled by them. I use the term "power connections" as a term of broad and general meaning, including all sorts of suitable connections controlled by the keys and acting upon the letter-controlling parts with power other than that exerted by the operator upon the keys. The chief benefit arising from the use of power connections in type-writing machines, type-setting machines, and other similar instruments is that it makes the touch lighter and so reduces the labor of the operator and increases the speed with which he can operate his machine.

In one or more of the combinations set forth in the statement of claim at the end hereof the term "power mechanisms" is used. This term is used in a sense largely similar to that of "power connections," already explained; and in general what has been said with reference to power connections applies to power mechanism.

Some of the combinations set forth in the statement of claim at the end hereof include as an element "electromagnetic letter-selecting mechanism," or "electromagnetic letter-controlling mechanism," "electromagnetic connections," and other similar expressions. I have already explained what I mean by "letter-selecting mechanisms" and "letter-controlling mechanism." By "electromagnetic letter-selecting mechanism" I mean letter-selecting mechanism including one or more electromagnetic devices. By "electromagnetic letter-controlling mechanism" I mean letter-controlling mechanism including one or more electromagnetic devices. By "electromagnetic connections" I mean connections including one or more electromagnets. An electromagnetic letter-selecting device, or an electromagnetic letter-controlling device, or an electromagnetic connection may consist chiefly of electromagnets with their circuits and electric connections, or it may consist chiefly of mechanical devices, controlled in a greater or less degree by one or more electromagnets. Thus in the preferred construction illustrated in Figs. 1, 2, 3, and 4 the letter-selecting device is composed chiefly of the electromagnets $b$ $b$ with their electrical connections, while in the device of Figs. 13, 14, and 15 one magnet only is used for each selecting device, or system of connections, the major portion of which is wholly mechanical.

In various places in this specification and in the statement of claim at the end hereof such terms as ($a$) "quick-acting letter-selecting mechanism," and "slow-acting letter-selecting mechanism," or ($b$) "quick-acting letter-controlling mechanism" and "slow-acting letter-controlling mechanism," or ($c$) "quick-acting connections" and "slow-acting connections," and other similar terms are used. What I mean by "letter-selecting mechanism" and "letter-controlling mechanism" has already been explained, and "connections" is a word of such obvious import that explanation of its meaning is unnecessary. What I refer to, in the phrases above mentioned and in similar phrases, by the words "quick-acting" and "slow-acting" is the length of time elapsing between the depressing of the key, or other similar action of the operator, and the bringing of the corresponding letter into position for printing. Thus by a "quick-acting letter-selecting device" or a "quick-acting letter-controlling device" I mean a letter-selecting device or a letter-controlling device which selects or controls its letter in a short interval of time after the depressing of the key or other action of the operator employed for the production of the letter, and by a "slow-acting letter-selecting device" or a "slow-acting letter-controlling device" I mean a letter-selecting device or a letter-controlling device which requires a longer interval of time after the depressing of the key, or other corresponding action of the operator, to bring its letter into position. By "quick-acting connections" between keys and printing-characters, or between keys and electromagnets, or between keys and other specified parts I mean connections which effect the action of the keys upon the parts with which they connect the keys in a short interval of time after the depressing of the keys, and by "slow-acting connections" between keys and printing-characters, or between keys and electromagnets, or between keys and other named parts, I mean connections which effect the action of the keys upon the parts with which they connect the keys in a longer interval of time after the depressing of the keys. Several different ways of making the one set of parts quick acting and the other set of parts slow acting have been hereinbefore described, and doubtless other ways may be employed. I do not restrict or limit myself in this regard to any particular sort of quick-acting or slow-acting parts, for my invention does not consist either in quick-acting parts or in slow-acting parts, considered separately, but in the combination of parts or sets of parts organized so that the one acts quickly and the other more slowly, so that when acted on by the operator simultaneously they produce their respective letters successively; and when I speak of "quick-acting" and "slow-acting" circuits, or of "quick-operating circuits" and "slow-operating circuits," I mean, respectively, circuits which produce their actions in a short interval of time and circuits which produce their actions in a longer interval of time after the depressing of the keys or other corresponding actions of the operator. Whether this difference in the rapidity of operation of the circuits be made electrically by giving different time-constants to the quick-acting and slow-acting circuits, respectively, as hereinbefore pointed out, or whether it be made mechanically by postponing the completing of the slow-acting circuits for an instant after the depressing of the keys and after the completing of the quick-acting circuits, (after the fashion, for example, of such devices as those illustrated in Figs. 4, 10, and 15,) is entirely immaterial, so far as important features of my invention are concerned. In type-writing machines, indeed, I consider it somewhat preferable, for various practical reasons, to make the difference of operation of the quick-acting circuits and the slow-acting circuits by postponing the completing of the slow-acting circuits until an instant after the depressing of the keys; but this is not indispensable, even in type-writing machines, and it is little, if any, preferable to the other method above mentioned of making the circuits slow acting in connection with machines other than type-writers, to which my invention is applicable, such as type-setting, matrix-making, and linotyping machines.

Some of the combinations set forth in the statement of claim at the end hereof include as an element "permutational circuit-selecting mechanism" or "permutational circuit-selecting devices." Figs. 1 and 17 illustrate diagrammatically the sort of permutational circuit-selecting mechanism which I prefer to employ. I do not, however, at all limit or restrict myself to the particular sort of permutational circuit-selecting mechanism illustrated in those figures. I do not in this application claim the invention of any peculiar or new sort of permutational circuit-selecting mechanism, considered by itself alone, (but the particular form illustrated in the drawings before mentioned, being of my invention, is claimed in a prior application, Serial No. 572,121, filed December 14, 1895,) and I refer by these words "permutational circuit-selecting mechanism" or "permutational circuit-selecting devices" to something already known in the art, and of which there are several different forms. Permutational circuit-selecting devices are illustrated, for example, in the patents to Munson, No. 246,411, dated August 30, 1881, and No. 352,143, dated November 9, 1886; in the patent to Beyerlen, No. 331,275, dated December 1, 1885, and other forms are known. I have myself invented quite a number of different forms of permutational circuit-selecting devices. All permutational circuit-selecting devices have one feature in common, to wit, the capacity to close or otherwise affect by a small number of keys, acting in different combinations or permutations, a larger number of circuits, each as required. This is the one point in which they are alike. In other respects they are infinitely diversified; and without attempting an exact definition of the term "permutational circuit-selecting mechanism" or "permutational circuit-selecting devices" I would say that I use such terms broadly as general terms for the whole group of such devices, and that I do not limit or restrict myself in the carrying out of my invention to any particular sort.

In several places in this specification, and particularly in the statement of claim at the end hereof, I speak of two sets of letter-selecting devices, or of two letter-selecting mechanisms, or of two sets of letter-controlling parts or devices, or of two letter-controlling mechanisms, or of two sets of keys, or other parts, "bringing their respective letters into action successively," or of the two letters belonging respectively to the two sets of parts before mentioned being "brought into action successively," or "produced successively;" or 1 express of the two sets of parts, the limitation that "they produce their letters successively," or that "they produce their respective letters successively," or that "they produce their respective letters in rapid succession," or that they "act successively for the production of their respective letters." I use the terms "brought into action" and "produced" synonymously in the phrases above quoted; and in the sense in which I employ the language in this specification a letter is brought into action or produced in a type-writing machine when it is moved to the printing-point; and the same is true of those sorts of matrix-making and linotyping machines in which a soft or plastic material is impressed by the different characters separately and successively, and in those type-setting machines, matrix-making machines, and linotyping machines in which one or more lines of type or matrix pieces are set up, from which, after they are set up, an impression is taken, a letter is brought into action or produced, so far as the work of the operator is concerned, and in the sense of the language employed in this specification, when the type or the matrix-piece corresponding to such letter—in other words, the printing-character, whatever that may be—is taken from its separate place to its place in the assemblage of types, matrix-pieces, or printing-characters forming into a line.

In various places in this specification, and particularly in the statement of claim at the end hereof, I speak of "type-writing machines, type-setting machines, and other similar instruments." By this language I refer to the whole genus or family of machines employed to produce printed matter by the successive production of the several words and characters as substitutes for writing by hand, and also to the whole genus or family of machines employed to set type or to make up type as substitutes for setting up the types by hand, and in particular I refer by the language above quoted as well (a) to those machines which are technically called "matrix-making" machines, and (b) to those machines which are technically termed "linotyping-machines" or "linotype-machines," as to those which actually make up the whole form of type out of separate types set together.

I do not claim in this application (a) the peculiar form of permutational circuit-selecting device illustrated in the drawings, nor (b) the peculiar arrangement of the spacing mechanism and spacing-magnets illustrated in the drawings, nor (c) the combination, with the type-bars, of the peculiar electromagnets illustrated in the drawings, all which constitute portions of the subject-matter of a prior application of mine, Serial No. 572,121, filed December 14, 1895, in which they are claimed individually and in combination with each other and suitable character devices. Nor do I claim in this application the features of invention residing in the combination, with a set of type-bars or other suitable character-controlling devices, of (a) a motor, (b) keys, (c) detachable connections between the type-bars or equivalents and the motor, such detachable connections being controlled by the keys, and (d) means, controlled by the keys, serving to bring the motor into activity to make a character selected by the keys, an illustration of which combination appears in Figs. 13, 14, and 15 of the drawings accompanying this specification. Such mechanism forms a portion of the subject-matter of a divisional application, No. 601,520, filed August 3, 1896, in which it is claimed. Nor do I claim in this application the features of invention residing in the combination, with a set of type-bars or other suitable character-controlling devices, of (a) an operating-frame, (b) keys, (c) detachable connections between the frame and the type-bars controlled by the keys, and (d) connections between the keys and the operating-frame controlling said frame. Such features of invention constitute a part of the subject-matter of the divisional application last above mentioned, in which they are claimed; but

What I claim as my invention, and desire to secure by Letters Patent, is—

1. In a type-writing machine, type-setting machine, or other similar instrument, an organization for producing consecutive letters by simultaneous actions of the operator, including in combination, (a) suitable printing-characters; (b) a quick-acting letter-selecting mechanism, adapted to afford facility to the operator to produce by its manipulation, various letters singly, each as desired; and (c) a slow-acting letter-selecting mechanism, also adapted to afford facility to the operator to produce by its manipulation various letters singly, each as desired; the two letter-selecting mechanisms mentioned being adapted and arranged to be operated simultaneously, and serving when thus simultaneously operated for the production of consecutive letters, one letter from each of the two letter-selecting mechanisms above mentioned; the quick-acting letter-selecting mechanism above mentioned and the slow-acting letter-selecting mechanism above mentioned being arranged to have such differing rapidities of action that when operated simultaneously, as before mentioned, they produce their respective letters successively.

2. In a type-writing machine, type-setting machine or other similar instrument, an organization for producing consecutive letters by simultaneous actions of the two hands of the operator, including in combination, (a) suitable printing-characters; (b) a quick-acting letter-selecting mechanism, adapted to afford facility to the operator to produce by its manipulation various letters singly each as desired; and (c) a slow-acting letter-selecting mechanism, also adapted to afford facility to the operator to produce by its manipulation various letters singly, each as desired; the two letter-selecting mechanisms mentioned being adapted and arranged to be operated simultaneously, one by the right hand and the other by the left hand of the operator, and serving when thus simultaneously operated, for the production of consecutive letters, one letter from each of the two letter-selecting mechanisms above mentioned; the quick-acting letter-selecting mechanism above mentioned, and the slow-acting letter-selecting mechanism above mentioned, being arranged to have such differing rapidities of action that when operated simultaneously, one by the right hand and the other by the left hand of the operator, as before mentioned, they produce their respective letters successively.

3. In a type-writing machine, type-setting machine or other similar instrument, an organization for the production of consecutive letters by the simultaneous depressing of different keys, including in combination, suitable printing-characters; two sets of keys, each set being adapted to afford facility to the operator to produce by the manipulation of its various keys various letters individually, each as desired; the keys of the two sets being arranged in such juxtaposition that keys of each set can be depressed by the operator at the same instant; keys of the two sets operating, when thus depressed simultaneously, for the production of consecutive letters, one letter from each set; quick-acting letter-controlling mechanism, connected with one of the sets of keys above mentioned; and slow-acting letter-controlling mechanism connected with the other set of keys before mentioned; the quick-acting and the slow-acting letter-controlling mechanisms above mentioned being arranged with such differing rapidities of action, that when keys of the two sets before mentioned are depressed simultaneously, the two letters belonging respectively to them are produced successively.

4. In a type-writing machine, type-setting machine, or other similar instrument, an organization for producing consecutive letters by the simultaneous depressing of different keys, including in combination, a single set of ultimate letter-controlling devices; two sets of keys, each set being adapted to afford facility to the operator to produce by the manipulation of its various keys, various letters individually, each as required; the keys of the two sets being arranged in such juxtaposition that keys of each set can be depressed by the operator at the same instant; keys of the two sets operating when thus depressed simultaneously, for the production of consecutive letters, one letter from each set; quick-acting connection connecting the keys of one of the sets before mentioned with the set of ultimate letter-controlling devices above mentioned; and slow-acting connections, connecting the keys of the other set before mentioned with the same set of ultimate letter-controlling devices above mentioned; the quick-acting connections and the slow-acting connections above mentioned being arranged with such differing rapidities of action that when keys of the two sets before mentioned are depressed simultaneously, the two letters belonging respectively to them are produced successively.

5. In a type-writing machine, or other similar instrument, and in combination, type-bars arranged so that they play to a common printing-center; two sets of keys, adapted to be operated simultaneously, and serving to afford facility to the operator to make consecutive letters two at a time, one letter from each set of keys; quick-acting connections intermediate one set of the keys above mentioned and the type-bars controlled thereby; and slow-acting connections intermediate the other set of keys before mentioned and the type-bars controlled thereby; the quick-acting connections and the slow-acting connections aforesaid, being arranged with such differing rapidities of operation that when keys of the two sets are depressed simultaneously the type-bars controlled respectively by the keys depressed of the two sets before mentioned, print their respective letters in rapid succession.

6. In a type-writing machine, type-setting machine, or other similar instrumentality, an organization for producing consecutive letters by simultaneous actions of the operator, including (a) suitable printing-characters; (b) a quick-acting letter-controlling mechanism, serving for the production of letters individually; (c) a slow-acting letter-controlling mechanism, also serving for the production of letters individually, each as desired; one of the letter-controlling mechanisms above mentioned being a permutational letter-selecting device, having a number of keys less than the number of characters controlled by it, said permutational letter-selecting device being arranged in such a manner that its small number of keys, operating in various combinations or permutations, serves to designate individually the various letters controlled by it, the quick-acting and the slow-acting letter-controlling mechanisms above mentioned being arranged with such differing rapidities of operation that when acted upon by the operator simultaneously, they produce their respective letters successively.

7. In a type-writing machine, type-setting machine or other similar instrument, an organization for producing consecutive letters by simultaneous actions of the operator, including (a) suitable printing-characters; (b) a quick-acting permutational letter-selecting mechanism, serving for the production of letters individually; and (c) a slow-acting permutational letter-selecting mechanism, also serving for the production of letters individually; each of the permutation letter-selecting mechanisms above mentioned having a number of keys less than the number of characters controlled by it, and being arranged in such a manner that its small number of keys, operating in various permutations or combinations, serves to designate the various characters for which it serves; the two sets of keys belonging respectively one set to the quick-acting and the other set to the slow-acting permutational letter-selecting devices above mentioned being adapted to be depressed simultaneously; the quick-acting and the slow-acting permutational letter-selecting devices hereinbefore mentioned, being arranged with such differing rapidities of operation that when acted on by the operator simultaneously, they produce their respective letters successively.

8. In a type-writing machine, type-setting machine, or other similar instrument, and in combination, two sets of keys adapted to be operated simultaneously, and serving to afford facility to the operator to produce consecutive letters simultaneously, one letter from each set of keys; suitable letter-controlling parts; quick-acting power connections intermediate one set of keys and the letter-controlling parts controlled by such keys; and slow-acting power connections intermediate the other set of keys and the letter-controlling parts controlled by such keys; the whole being constructed and arranged in such a manner that when keys of the two sets are depressed simultaneously, the power connections belonging respectively to them, act upon the letter-controlling parts before mentioned successively.

9. In a type-writing machine, type-setting machine or other similar instrument, and in combination, one set of ultimate letter-controlling parts; two sets of keys operating such ultimate letter-controlling parts; the keys of the two sets being adapted and arranged to be depressed simultaneously, and serving to afford facility to the operator to produce consecutive letters simultaneously, one from each set of keys; a quick-acting power connection intermediate one set of keys and the ultimate letter-controlling parts before mentioned; and a slow-acting power connection intermediate the other set of keys and the set of ultimate letter-controlling parts before mentioned; the whole being constructed and arranged in such a manner that when keys of the two sets before mentioned are depressed simultaneously, the power connections belonging respectively to them act successively upon the corresponding ultimate letter-controlling parts belonging to the one set before mentioned.

10. In a type-writing machine or other similar instrument, and in combination, two sets of keys adapted to be operated simultaneously and serving to afford facility to the operator to produce consecutive letters two at a time; a set of type-bars arranged so that they strike to a common printing-center; quick-acting connections intermediate one of the sets of keys before mentioned and the type-bars before mentioned; and slow-acting connections intermediate the other set of keys before mentioned and the set of type-bars aforesaid; the connections before mentioned including power mechanism, serving for impelling the type-bars; the quick-acting connections and the slow-acting connections aforesaid being constructed with such differing rapidities of operation that when keys of the two sets before mentioned are depressed simultaneously, the type-bars controlled respectively by the keys depressed of the two sets before mentioned, print successively.

11. In a type-writing machine, type-setting machine, or other similar instrumentality, an organization for producing consecutive letters by simultaneous actions of the operator, including, in combination (a) suitable printing-characters; (b) a quick-acting electromagnetic letter-selecting mechanism, adapted to afford facility to the operator to produce by its manipulation various letters singly, each as desired; and (c) a slow-acting electromagnetic letter-selecting mechanism, also adapted to afford facility to the operator to produce by its manipulation various letters singly, each as desired; the two letter-selecting mechanisms mentioned being adapted and arranged to be operated simultaneously, and serving when thus simultaneously operated, for the production of consecutive letters, one letter from each of the two selecting mechanisms above mentioned; the quick-acting letter-selecting mechanism above mentioned and the slow-acting letter-selecting mechanism above mentioned, being arranged to have such differing rapidities of action that when operated simultaneously, they produce their respective letters successively.

12. In a type-writing machine, type-setting machine, or other similar instrument, an organization for the production of consecutive letters by the simultaneous depressing of different keys, including, in combination a suitable system of printing-characters; two sets of keys, each set being adapted to afford facility to the operator to produce by the manipulation of its various keys, various letters individually, each as required; the keys of the two sets being arranged in such juxtaposition that keys of each set can be depressed by the operator at the same instant; keys of the two sets operating, when thus depressed simultaneously, for the production of consecutive letters, one letter from each set; quick-acting electromagnetic letter-controlling mechanism, connected with one of the sets of keys above mentioned; and slow-acting electromagnetic letter-controlling mechanism connected with the other set of keys before mentioned; the quick-acting and the slow-acting letter-controlling mechanisms above mentioned being arranged with such differing rapidities of action, that when keys of the two sets before mentioned are depressed simultaneously, the two letters belonging respectively to them are produced successively.

13. In a type-writing machine, type-setting machine, or other similar instrument, an organization for producing consecutive letters by the simultaneous depressing of different keys, including in combination, a single set of ultimate letter-controlling devices; two sets of keys, each set being adapted to afford facility to the operator to produce by the manipulation of its various keys, various letters individually, each as required; the keys of the two sets being arranged in such juxtaposition that keys of each set can be depressed by the operator at the same instant; keys of the two sets operating, when thus depressed simultaneously, for the production of consecutive letters, one letter from each set; quick-acting electromagnetic mechanism connecting the keys of one of the sets before mentioned with the set of ultimate letter-controlling devices above mentioned; and slow-acting electromagnetic mechanism connecting the keys of the other set before mentioned with the same set of ultimate letter-controlling devices before mentioned; the quick-acting connections and the slow-acting connections above mentioned being arranged to have such differing rapidities of action, that when keys of the two sets before mentioned are depressed simultaneously, the two letters belonging respectively to them are brought into action successively.

14. In a type-writing machine, and in combination, type-bars arranged so that they play to a common printing-center; two sets of keys adapted to be operated simultaneously, and serving to afford facility to the operator to make consecutive letters two at a time, one letter from each set of keys; quick-acting electromagnetic connections intermediate one set of the keys before mentioned and the type-bars controlled thereby; and slow-acting electromagnetic connections intermediate the other set of keys before mentioned and the type-bars connected thereby; the quick-acting connections and the slow-acting connections aforesaid, being arranged with such differing rapidities of operation that when keys of the two sets are depressed simultaneously, the type-bars controlled respectively by the keys depressed of the two sets before mentioned, print their respective letters in rapid succession.

15. In a type-writing machine, type-setting machine or other similar instrument, an organization for producing consecutive letters by simultaneous actions of the operator, including (a) suitable printing-characters; (b) a set of quick-operating electric circuits, controlling printing-characters; (c) a set of slow-operating electric circuits, also controlling printing-characters; (d) circuit-controlling mechanism for the quick-operating circuits, adapted to afford facility to the operator to produce by its manipulation various letters singly, as desired; and (e) circuit-controlling mechanism for the slow-operating circuits, also adapted to afford facility to the operator for the production of various letters singly, each as desired; the two circuit-controlling mechanisms mentioned being adapted and arranged to be operated simultaneously for the production of consecutive letters, one from each; the quick-operating circuits above mentioned and the slow-operating circuits above mentioned being arranged with such differing rapidities of operation that when their respective circuit-controlling devices are acted on by the operator simultaneously, they produce their respective letters successively.

16. In a type-writing machine, type-setting machine, or other similar instrument, an organization for producing consecutive letters by simultaneous actions of the operator, including (a) suitable printing-characters; (b) a set of quick-operating electric circuits, controlling printing-characters; (c) a set of slow-operating electric circuits also controlling printing-characters; (d) keys for the quick-acting circuits, arranged and adapted so that they afford facility to the operator to produce by their manipulation various letters singly, as desired; and (e) keys for the slow-operating circuits, also adapted to afford facility to the operator to produce by their manipulation various letters singly, as desired; the two sets of keys above mentioned being adapted and arranged to be acted upon simultaneously by the operator, for the production of consecutive letters, one from each set; the quick-operating circuits above mentioned and the slow-operating circuits above mentioned being arranged to have such differing rapidities of operation that when keys controlling quick-operating and slow-operating circuits are acted upon simultaneously by the operator, they produce their respective letters successively.

17. In a type-writing machine, type-setting machine, or other similar instrument, an organization for producing consecutive letters by simultaneous actions of the operator, including in combination with suitable printing-characters, (a) suitable electromagnets; (b) two sets of keys, controlling printing-characters, through the intervention of the electromagnets before mentioned; each set of keys being adapted to afford facility to the operator to produce by the manipulation of its various keys, various letters individually, each as required; the keys of the two sets being arranged in such juxtaposition that keys of each set can be depressed by the operator at the same instant; keys of the two sets operating, when thus depressed simultaneously, for the production of consecutive letters, one letter from each set; (c) quick-acting connections intermediate one of the sets of keys above mentioned and the electromagnet or magnets controlled thereby; and (d) slow-acting connections intermediate the other set of keys above mentioned and the electro magnet or magnets controlled thereby; the quick-acting and the slow-acting connections above mentioned being arranged with such differing rapidities of action that when keys of the two sets above mentioned are depressed simultaneously, they bring their respective letters into action successively.

18. In a type-writing machine, type-setting machine, or other similar instrument, an organization for producing consecutive letters by simultaneous actions of the operator, including, in combination with suitable printing-characters, (a) a set of electromagnets controlling the printing-characters; (b) two sets of keys acting upon the one set of electromagnets above mentioned, each set of keys being arranged and adapted so that it affords facility to the operator to produce by its manipulation, various letters singly, each as desired, through the action of the keys upon the character-controlling electromagnets above mentioned; the keys of the two sets above mentioned being arranged in such juxtaposition that keys of each set can be depressed simultaneously; keys of the two sets operating, when thus depressed simultaneously, for the production of consecutive letters, one letter from each set; (c) quick-acting connections intermediate one set of keys and the set of electromagnets above mentioned; and (d) slow-acting connections intermediate the other set of keys and the same set of electromagnets above mentioned; the quick-acting connections and the slow-acting connections above mentioned, being arranged with such differing rapidities of operation that when keys of the two sets above mentioned are depressed simultaneously, the electromagnets of the single set of electromagnets above mentioned, affected respectively by the one set of keys and the other set of keys above mentioned, act successively; so that the characters belonging to the keys of the two sets above mentioned, depressed simultaneously, are brought into action successively.

19. In a type-writing machine, type-setting machine, or other similar instrument, an organization for producing consecutive letters by the simultaneous depressing of different keys, including, in combination with suitable printing-characters, (a) a set of electromagnets controlling the printing-characters above mentioned; (b) a set of circuits, each circuit of the set including, when closed, one of the electromagnets above mentioned; (c) another set of circuits, each including when closed, one of the electromagnets before mentioned; the whole arrangement being such that each of a plurality of the magnets of the set above mentioned forms a part of one of the circuits belonging to the set of circuits first above mentioned and also forms a part of one of the circuits belonging to the set of circuits second in this paragraph mentioned; and (d) two sets of keys, one set of keys controlling one of the sets of circuits above mentioned, and the other set of keys controlling the other set of circuits above mentioned; each set of keys, with its controlled circuits and other dependent parts, being adapted to afford facility to the operator to produce by its manipulation, various letters individually, each as required; the two sets of keys being arranged in such juxtaposition that keys of each set can be depressed by the operator at the same time; keys of the two sets operating, when thus depressed simultaneously, for the production of consecutive letters, one letter from each set; the whole being constructed and arranged in such a manner that the circuits belonging to one of the sets above mentioned, energize their magnets immediately upon the depressing of the keys, while the circuits of the other set energize their magnets an instant after the depressing of the keys, so that when keys of the two sets above mentioned are depressed simultaneously, they bring their respective letters into action successively.

20. In a type-writing machine, or other similar instrument, an organization for producing consecutive letters by simultaneous actions of the operator, including, in combination, (a) type-bars arranged so that they play to a common printing-center; (b) a set of electromagnets, serving for the impelling of the type-bars; (c) two sets of keys acting upon the one set of electromagnets above mentioned, each set of keys being arranged and adapted so that it affords facility to the operator to produce by its manipulation various letters singly, each as desired, through the action of the keys upon the type-bar-impelling electromagnets above mentioned; the keys of the two sets above mentioned being arranged in such juxtaposition that keys of each set can be depressed simultaneously; keys of the two sets operating, when thus depressed simultaneously, for the production of consecutive letters, one letter from each set of keys; (d) quick-acting connections intermediate one set of keys and the set of electromagnets above mentioned; and (e) slow-acting connections intermediate the other set of keys and the same set of electromagnets above mentioned; the quick-acting connections and the slow-acting connections above mentioned, being arranged with such differing rapidities of operation that when keys of the two sets above mentioned are depressed simultaneously, the electromagnets of the single set of electromagnets above mentioned, affected respectively by the one set of keys and by the other set of keys above mentioned, impel their respective type-bars to the printing-point successively, so that the characters belonging to the keys of the two sets above mentioned, depressed simultaneously, are brought into action successively.

21. In a type-writing machine, type-setting machine, or other similar instrument, an organization for producing consecutive letters by the simultaneous depressing of different keys, including, in combination (a) type-bars arranged so that they play to a common printing-center; (b) a single set of electromagnets; serving to actuate type-bars; (c) a set of circuits, each circuit of the set including, when closed, one of the electromagnets before mentioned; (d) another set of circuits, each including, when closed, one of the electromagnets before mentioned; the whole arrangement being such that each of a plurality of the magnets of the set above mentioned, forms a part of one of the circuits belonging to the set of circuits first above mentioned, and also forms a part of one of the circuits belonging to the set of circuits second in this paragraph mentioned; and (e) two sets of keys, one set of keys controlling one of the sets of circuits above mentioned, and the other set of keys controlling the other set of circuits above mentioned; each set of keys, with its controlled circuits and other dependent parts, being adapted to afford facility to the operator to produce by its manipulation various letters individually, each as required; the two sets of keys being arranged in such juxtaposition that keys of each set can be depressed by the operator at the same time; keys of the two sets operating, when thus depressed simultaneously, for the production of consecutive letters, one letter from each set; the whole being constructed and arranged in such a manner that the circuits belonging to one of the sets above mentioned energize their magnets immediately upon the depressing of the keys, while the circuits of the other set energize their magnets an instant after the depressing of the keys, so that when keys of the two sets above mentioned are depressed simultaneously, they bring their respective type-bars into action successively.

22. In a type-writing machine, type-setting machine or other similar instrument, an organization for producing consecutive letters by simultaneous actions of the operator including, in combination with suitable printing-characters, a quick-acting letter-controlling mechanism, serving for the making of letters individually; a slow-acting letter-controlling mechanism, also serving for the making of letters individually, each as desired; the two letter-controlling mechanisms mentioned being arranged and adapted to be operated simultaneously, one by the right hand and the other by the left hand; one of the letter-controlling mechanisms above mentioned having (a) a plurality of circuits, and (b) permutational circuit-selecting mechanism, with a number of circuit-controlling keys less than the number of circuits controlled by them; said permutational circuit-selecting mechanism being constructed and arranged in such a manner that its small number of keys, operating in various permutations or combinations, serve to affect individually the various circuits before mentioned, each as required: the quick-acting and the slow-acting letter-controlling mechanisms above mentioned being arranged with such differing rapidities of operation that when acted on by the operator simultaneously, for the production of consecutive letters, they bring their respective letters into action successively.

23. In a type-writing machine, type-setting machine, or other similar instrument, an organization for producing consecutive letters by simultaneous actions of the operator including, in combination with suitable printing-characters, two letter-selecting mechanisms, adapted to coact for the production of consecutive letters, and each including (a) a plurality of circuits, and (b) a permutational circuit-selecting mechanism, having a number of circuit-controlling keys less than the number of circuits to be controlled by them, such permutational circuit-selecting mechanism being constructed and arranged in such a manner that its small number of keys, operating in various permutations or combinations, serves to affect individually the various circuits belonging to it, each as required; the two sets of keys belonging respectively to the two letter-selecting mechanisms above mentioned, being adapted to be depressed simultaneously and operating when thus simultaneously depressed for the production of consecutive letters, one from each set of keys.

24. In a type-writing machine, type-setting machine, or other similar instrumentality, an organization for producing consecutive letters in pairs by simultaneous actions of the operator, including in combination with suitable printing-characters, two letter-selecting mechanisms, each adapted to afford facility to the operator to produce, by its manipulation various letters individually, each as required, to wit, a quick-acting letter-selecting mechanism and a slow-acting letter-selecting mechanism, each of said letter-selecting mechanisms including (a) a plurality of circuits, and (b) a permutational circuit-selecting mechanism, having a number of keys less than the number of circuits controlled by them; the permutational circuit-selecting mechanisms aforementioned being each constructed and arranged in such a manner that its small number of keys, acting in various combinations or permutations, serves to affect individually the various circuits belonging to it, each as desired; the two sets of keys before mentioned belonging respectively one set to the quick-acting letter-selecting mechanism and the other set to the slow-acting letter-selecting mechanism, being adapted to be depressed simultaneously, and operating, when thus simultaneously depressed, for the production of consecutive letters, one from each set of keys, the quick-acting and the slow-acting letter-selecting mechanisms above mentioned being arranged with such differing rapidities of operation that when acted on by the operator simultaneously, as above mentioned, they bring their respective letters into action successively.

25. In a type-writing machine, type-setting machine, or other similar instrument, an organization for producing consecutive letters in pairs, by simultaneous operations of the two hands of the operator, including in combination, two letter-selecting mechanisms, each adapted to afford facility to the operator to produce by its manipulation various letters singly, as desired; the two letter-selecting mechanisms mentioned being adapted and arranged to be operated simultaneously, one by the right hand and the other by the left hand of the operator and serving when thus simultaneously operated for the production of consecutive letters, one from each selecting mechanism; the two selecting mechanisms above mentioned being constructed, connected and arranged in such a manner that one of the selecting mechanisms, in acting to make its letter, brings the other letter-selecting mechanism into action for the making of its letter; so that the two selecting mechanisms, above mentioned, when acted on by the two hands of the operator simultaneously for the production of consecutive letters, one from each, produce their respective letters in rapid succession.

26. In a type-writing machine, type-setting machine, or other similar instrument, an organization for producing consecutive letters in pairs, by the simultaneous depressing of different keys, including, in combination, (a) a set of keys and letter-selecting mechanism connected therewith, the keys and letter-selecting mechanism being adapted to afford facility to the operator to produce by the manipulation of the various keys, various letters individually, each as required; and (b) another set of keys and letter-selecting mechanism connected therewith, adapted to afford facility to the operator to produce by the manipulation of the various keys various letters individually, each as desired; the whole being constructed and arranged in such a manner that one of the letter-selecting mechanisms, in acting to make a letter, brings the other selecting mechanism into action for the making of its letters, so that the two selecting mechanisms, when their keys are operated simultaneously, produce their letters successively.

27. In a type-writing machine, type-setting machine, or other similar instrument, an organization for producing consecutive letters in pairs by the simultaneous depressing of different keys, including in combination, (a) a set of keys, and a letter-selecting mechanism controlled thereby; (b) another set of keys, and letter-selecting mechanism controlled by them; each of the sets of keys above mentioned, with its dependent letter-selecting mechanism, being adapted to afford facility to the operator to produce by the manipulation of its various keys, various letters singly, each as desired; and (c) a key-controlled device, operating to bring the letter-selecting mechanism connected with one of the sets of keys above mentioned into action a short interval of time after the depressing of the keys and after the letter-selecting mechanism connected with the other set of keys above mentioned; so that when the keys of the two sets above mentioned are depressed simultaneously, the letter-selecting mechanisms controlled respectively by them act successively for the production of their respective letters.

28. In a type-writing machine, type-setting machine, or other similar instrument, an organization for producing consecutive letters in pairs, by the simultaneous depressing of different keys, including in combination, a set of keys and dependent letter-controlling parts connected therewith, including power mechanism; another set of keys and dependent letter-controlling parts connected therewith, likewise including power mechanism; each of the sets of keys above mentioned being adapted, with its dependent parts, to afford facility to the operator for making various letters singly, each as desired; the two sets of keys being adapted to be acted on by the operator simultaneously, for the production of consecutive letters, one letter from each set of keys; key-controlled means whereby the power mechanism above mentioned, connected with one set of keys is brought into action immediately on the depressing of keys of such set; and a device serving to bring the power mechanism controlled by the other set of keys before mentioned, into action a short interval of time after the depressing of the keys; so that when keys of the two sets before mentioned are depressed simultaneously, their respective letters are brought into action successively.

29. In a type-writing machine, type-setting machine or other similar instrument, an organization for producing consecutive letters in pairs, by the simultaneous depressing of different keys, including in combination, a set of keys and dependent letter-controlling parts connected therewith, including power mechanism; another set of keys and dependent letter-controlling parts connected therewith; likewise including power mechanism; each of the sets of keys above mentioned being adapted, with its dependent parts, to afford facility to the operator for making various letters singly, each as desired; the two sets of keys being adapted to be acted on by the operator simultaneously for the production of consecutive letters, one letter from each set of keys; the organization including means operating an instant after the depressing of the keys, to cut off power from the power mechanism operated by one of the sets of keys.

30. In a type-writing machine, type-setting machine or other similar instrument, an organization for producing consecutive letters in pairs, by the simultaneous depressing of different keys, including in combination, a set of keys and dependent letter-controlling parts connected therewith, including power mechanism; another set of keys and dependent letter-controlling parts connected therewith, likewise including power mechanism; each of the sets of keys above mentioned being adapted, with its dependent parts, to afford facility to the operator for making various letters singly, each as desired; the two sets of keys being adapted to be acted on by the operator simultaneously, for the production of consecutive letters, one letter from each set of keys; the organization including means operating an instant after the depressing of the keys to cut off power from the letter-controlling mechanism above mentioned as connected with one of the sets of keys above mentioned, and to admit power to the letter-controlling mechanism connected with the other set of keys before mentioned, so that the letters designated respectively by the different keys of the two sets depressed are produced successively.

31. In a type-writing machine, type-setting machine or other similar instrumentality, an organization for producing consecutive letters by the simultaneous depressing of different keys, including in combination, two sets of keys adapted to be operated simultaneously for the production of a letter from each, such sets of keys being in this paragraph termed for distinction's sake, "prime-acting" keys and "subsequently-acting" keys, respectively; electromagnets; electrical connections between the prime-acting keys and the electromagnets arranged in such a manner that the prime-acting keys close circuit so soon as they are depressed; a circuit-breaking device, operating to break circuits of the prime-acting keys an instant after they are closed and while the keys which closed them are still held down; and suitable electrical connections between the subsequently-acting keys and the electromagnets controlled by them; the whole being constructed, arranged and connected in such a manner that prime-acting and subsequently-acting keys, when depressed simultaneously, produce their respective letters in rapid succession.

32. In a type-writing machine, type-setting machine or other similar instrument, an organization for producing consecutive letters by the simultaneous depressing of different keys, including in combination, two sets of keys, adapted to be operated simultaneously, for the production of a letter from each, such sets of keys being hereinafter in this paragraph termed for distinction's sake, "prime-acting" keys and "subsequently-acting" keys respectively; electromagnets; electrical connections intermediate the prime-acting keys and the electro magnet or magnets controlled by them, arranged in such a manner that the prime-acting keys close circuit so soon as they are depressed; electrical connections intermediate the subsequently-acting keys and the electro magnet or magnets controlled by them; and a circuit-controlling device, operating an instant after the depressing of the keys, to complete or cause or permit the completing of the circuits controlled by the subsequently-acting keys depressed; the whole being constructed and arranged in such a manner that prime-acting and subsequently-acting keys, depressed simultaneously, close their respective circuits successively.

33. In a type-writing machine, type-setting machine or other similar instrument, an organization for producing consecutive letters by the simultaneous depressing of different keys, including in combination two sets of keys, adapted to be operated simultaneously, for the production of a letter from each, such sets of keys being hereinafter in this paragraph termed, for distinction's sake, "prime-acting" keys and "subsequently-acting" keys respectively; electromagnets; electrical connections intermediate the prime-acting keys and the electro magnet or magnets controlled by them, arranged in such a manner that the prime-acting keys close circuit so soon as they are depressed; and a circuit-controlling device operating an instant after the depressing of the keys, to break the circuit of the magnet or magnets controlled by the prime-acting keys depressed, and to close the circuit of the magnet or magnets of the subsequently-acting key or keys depressed; the whole being constructed and arranged in such a manner that when prime-acting and subsequently-acting keys are depressed simultaneously, their respective magnets act successively.

34. In a type-writing machine, and in combination, a multiplicity of type-bars, arranged so that they strike to a common printing-point; electromagnets serving to impel said type-bars; keys serving to close the circuits of the electromagnets aforesaid; and an automatic circuit-breaker, operating to break the circuit of the type-bar-impelling electro magnet or magnets controlled by the key or keys depressed, an instant after the depressing of the key and while the pressure on the key is maintained, so that the type-bar controlled by such magnet or magnets is left free to retreat from the printing-point after it delivers its blow, and while the key controlling it is held down.

35. In a type-writing machine, and in combination, a multiplicity of type-bars, arranged so that they strike to a common printing-point; electromagnets serving to impel said type-bars; keys serving to close the circuits of the electromagnets aforesaid; and a key-controlled electromagnetic circuit-breaker, operating to break the circuit of the type-bar-impelling electro magnet or magnets controlled by the key or keys depressed, an instant after the depressing of the key and while the pressure on the key is maintained, so that the type-bar controlled by such magnet or magnets is left free to retreat from the printing-point after it delivers its blow, and while the key controlling it is held down.

36. In a type-writing machine, and in combination, a multiplicity of type-bars, arranged so that they strike to a common printing-center; electromagnets, serving for the impelling of said type-bars; two sets of keys, hereinafter in this paragraph termed, for distinction's sake, "prime-acting" keys and "subsequently-acting" keys respectively, such keys being adapted to be depressed simultaneously and serving when thus simultaneously depressed for the production of successive letters, one letter from each set; electrical connections intermediate the prime-acting keys and the electro magnet or magnets controlled thereby, said connections being arranged in such a manner that the prime-acting keys close circuit so soon as they are depressed; an automatic circuit-breaker operating to break the circuit of the electro magnet or magnets controlled by the prime-acting key depressed, an instant after the depressing of the key, so that the type-bar controlled thereby is left free to retreat from the printing-point before the prime-acting key depressed is released by the operator; and suitable electrical connections for the subsequently-acting keys; the whole being constructed and arranged in such a manner that prime-acting and subsequently-acting keys when depressed simultaneously print successively.

37. In a type-writing machine, and in combination, a multiplicity of type-bars, arranged so that they strike to a common printing-center; electromagnets, serving for the impelling of said type-bars; two sets of keys, hereinafter in this paragraph termed, for distinction's sake, "prime-acting" keys and "subsequently-acting" keys respectively, such keys being adapted to be depressed simultaneously and serving when thus simultaneously depressed for the production of consecutive letters, one letter from each set; electrical connections intermediate the prime-acting keys and the electro magnet or magnets controlled thereby, said connections being arranged in such a manner that the prime-acting keys close circuits so soon as they are depressed; a circuit-controlling device, operating an instant after the depressing of the keys to break the circuit of the type-bar-impelling electro magnet or magnets controlled by the prime-acting key or keys depressed, so that the type-bar controlled thereby is left free to retreat from the printing-point; and to close the circuit of the type-bar-impelling electro magnet or magnets controlled by the subsequently-acting key or keys depressed; the whole being constructed and arranged in such a manner that prime-acting and subsequently-acting keys when depressed simultaneously print successively.

In testimony to the foregoing I have hereunto set my hand, at Washington, in the District of Columbia, this 3d day of January, A. D. 1896, in the presence of subscribing witnesses, whose names are hereto affixed.

THADDEUS CAHILL.

Attest:
M. H. CAHILL,
ARTHUR T. CAHILL.